United States Patent
Eagen et al.

(10) Patent No.: US 10,823,586 B2
(45) Date of Patent: Nov. 3, 2020

(54) MAGNETIC FIELD SENSOR HAVING UNEQUALLY SPACED MAGNETIC FIELD SENSING ELEMENTS

(71) Applicant: Allegro MicroSystems, LLC, Manchester, NH (US)

(72) Inventors: Jeffrey Eagen, Manchester, NH (US); Paul A. David, Bow, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 103 days.

(21) Appl. No.: 16/232,348

(22) Filed: Dec. 26, 2018

(65) Prior Publication Data
US 2020/0209017 A1 Jul. 2, 2020

(51) Int. Cl.
*G01D 5/245* (2006.01)
*G01D 5/14* (2006.01)
*G01M 13/021* (2019.01)

(52) U.S. Cl.
CPC ............. *G01D 5/245* (2013.01); *G01D 5/145* (2013.01); *G01M 13/021* (2013.01)

(58) Field of Classification Search
USPC ............. 324/206, 207.2, 242, 258, 252, 260
See application file for complete search history.

(56) References Cited

U.S. PATENT DOCUMENTS

| | | | |
|---|---|---|---|
| 3,132,337 A | 5/1964 | Martin | |
| 3,195,043 A | 7/1965 | Burig et al. | |
| 3,281,628 A | 10/1966 | Bauer et al. | |
| 3,607,528 A | 9/1971 | Gassaway | |
| 3,611,138 A | 10/1971 | Winebrener | |
| 3,661,061 A | 5/1972 | Tokarz | |

(Continued)

FOREIGN PATENT DOCUMENTS

| CH | 683469 | 3/1994 |
|---|---|---|
| CN | 102323554 | 1/2012 |

(Continued)

OTHER PUBLICATIONS

Extended European Search Report dated May 4, 2020 for European Application No. 19209914.1; 9 pages.

(Continued)

*Primary Examiner* — Vincent Q Nguyen
(74) *Attorney, Agent, or Firm* — Daly, Crowley, Mofford & Durkee, LLP

(57) ABSTRACT

A magnetic field sensor for sensing a movement of a target object an include a substrate having a major planar surface and three or more magnetic field sensing elements disposed upon the major planar surface of the substrate. The three or more magnetic field sensing elements can have respective major response axes, each major response axis parallel to the major planar surface of the substrate. The three or more magnetic field sensing elements comprise first and third magnetic field sensing elements and a second magnetic field sensing element disposed between the first and third magnetic field sensing elements. A first spacing between the first and second magnetic field sensing elements is less than a second spacing between the second and third magnetic field sensing elements. No other magnetic field sensing elements are disposed between the first and third magnetoresistance elements.

43 Claims, 15 Drawing Sheets

(56) References Cited

U.S. PATENT DOCUMENTS

| | | |
|---|---|---|
| 3,728,786 A | 4/1973 | Lucas et al. |
| 4,048,670 A | 9/1977 | Eysermans |
| 4,079,360 A | 3/1978 | Ookubo et al. |
| 4,180,753 A | 12/1979 | Cook, II |
| 4,188,605 A | 2/1980 | Stout |
| 4,204,317 A | 5/1980 | Winn |
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |
| 4,490,674 A | 12/1984 | Ito |
| 4,573,258 A | 3/1986 | Io et al. |
| 4,614,111 A | 9/1986 | Wolff |
| 4,649,796 A | 3/1987 | Schmidt |
| 4,668,914 A | 5/1987 | Kersten et al. |
| 4,670,715 A | 6/1987 | Fuzzell |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Aström et al. |
| 4,760,285 A | 7/1988 | Nelson |
| 4,761,569 A | 8/1988 | Higgs |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,829,352 A | 5/1989 | Popovic et al. |
| 4,833,406 A | 5/1989 | Foster |
| 4,893,027 A | 1/1990 | Kammerer et al. |
| 4,908,685 A | 3/1990 | Shibasaki et al. |
| 4,910,861 A | 3/1990 | Dohogne |
| 4,935,698 A | 6/1990 | Kawaji et al. |
| 4,944,028 A | 7/1990 | Iijima et al. |
| 4,954,777 A | 9/1990 | Klopfer et al. |
| 4,970,411 A | 11/1990 | Halg et al. |
| 4,983,916 A | 1/1991 | Iijima et al. |
| 5,012,322 A | 4/1991 | Guillotte |
| 5,021,493 A | 6/1991 | Sandstrom |
| 5,028,868 A | 7/1991 | Murata et al. |
| 5,038,130 A | 8/1991 | Eck et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,168,244 A | 12/1992 | Muranaka |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,220,207 A | 6/1993 | Kovalcik et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,286,426 A | 2/1994 | Rano, Jr. et al. |
| 5,289,344 A | 2/1994 | Gagnon et al. |
| 5,291,133 A | 3/1994 | Gokhale et al. |
| 5,304,926 A | 4/1994 | Wu |
| 5,315,245 A | 5/1994 | Schroeder et al. |
| 5,329,416 A | 7/1994 | Ushiyama et al. |
| 5,331,478 A | 7/1994 | Aranovsky |
| 5,332,956 A | 7/1994 | Oh |
| 5,332,965 A | 7/1994 | Wolf et al. |
| 5,341,097 A | 8/1994 | Wu |
| 5,351,028 A | 9/1994 | Krahn |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,432,444 A | 7/1995 | Yasohama et al. |
| 5,434,105 A | 7/1995 | Liou |
| 5,453,727 A | 9/1995 | Shibasaki et al. |
| 5,469,058 A | 11/1995 | Dunnam |
| 5,477,143 A | 12/1995 | Wu |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,497,083 A | 3/1996 | Nakazato et al. |
| 5,500,589 A | 3/1996 | Sumcad |
| 5,500,994 A | 3/1996 | Itaya |
| 5,508,611 A | 4/1996 | Schroeder et al. |
| 5,521,501 A | 5/1996 | Dettmann et al. |
| 5,541,506 A | 7/1996 | Kawakita et al. |
| 5,545,983 A | 8/1996 | Okeya et al. |
| 5,551,146 A | 9/1996 | Kawabata et al. |
| 5,552,706 A | 9/1996 | Carr |
| 5,572,058 A | 11/1996 | Biard |
| 5,581,170 A | 12/1996 | Mammano et al. |
| 5,581,179 A | 12/1996 | Engel et al. |
| 5,583,436 A | 12/1996 | Van De Walle et al. |
| 5,585,574 A | 12/1996 | Sugihara et al. |
| 5,596,272 A | 1/1997 | Busch |
| 5,612,618 A | 3/1997 | Arakawa |
| 5,619,137 A | 4/1997 | Vig et al. |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,657,189 A | 8/1997 | Sandhu |
| 5,691,637 A | 11/1997 | Oswald et al. |
| 5,694,038 A | 12/1997 | Moody et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andräet al. |
| 5,818,222 A | 10/1998 | Ramsden |
| 5,818,223 A | 10/1998 | Wolf |
| 5,831,513 A | 11/1998 | Lue |
| 5,839,185 A | 11/1998 | Smith et al. |
| 5,841,276 A | 11/1998 | Makino et al. |
| 5,844,411 A | 12/1998 | Vogt |
| 5,859,387 A | 1/1999 | Gagnon |
| 5,886,070 A | 2/1999 | Honkura et al. |
| 5,883,567 A | 3/1999 | Mullins, Jr. |
| 5,912,556 A | 6/1999 | Frazee et al. |
| 5,942,895 A | 8/1999 | Popovic et al. |
| 5,963,028 A | 10/1999 | Engel et al. |
| 6,011,770 A | 1/2000 | Tan |
| 6,016,055 A | 1/2000 | Jager et al. |
| 6,043,644 A | 3/2000 | de Coulon et al. |
| 6,043,646 A | 3/2000 | Jansseune |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,100,754 A | 8/2000 | Kim et al. |
| 6,136,250 A | 10/2000 | Brown |
| 6,166,535 A | 12/2000 | Irle et al. |
| 6,169,396 B1 | 1/2001 | Yokotani et al. |
| 6,175,232 B1 | 1/2001 | De Coulon et al. |
| 6,175,233 B1 | 1/2001 | McCurley et al. |
| 6,180,041 B1 | 1/2001 | Takizawa |
| 6,181,036 B1 | 1/2001 | Kazama et al. |
| 6,184,679 B1 | 2/2001 | Popovic et al. |
| 6,194,893 B1 | 2/2001 | Yokotani et al. |
| 6,198,373 B1 | 3/2001 | Ogawa et al. |
| 6,232,768 B1 | 5/2001 | Moody et al. |
| 6,236,199 B1 | 5/2001 | Irle et al. |

(56) References Cited

U.S. PATENT DOCUMENTS

| | | |
|---|---|---|
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,864 B1 | 7/2001 | De Winter et al. |
| 6,265,865 B1 | 7/2001 | Engel et al. |
| 6,278,269 B1 | 8/2001 | Vig et al. |
| 6,288,533 B1 | 9/2001 | Haeberli et al. |
| 6,291,989 B1 | 9/2001 | Schroeder |
| 6,297,627 B1 | 10/2001 | Towne et al. |
| 6,297,628 B1 | 10/2001 | Bicking et al. |
| 6,323,642 B1 | 11/2001 | Nishimura et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,356,741 B1 | 3/2002 | Bilotti et al. |
| 6,366,079 B1 | 4/2002 | Uenoyama |
| 6,392,478 B1 | 5/2002 | Mulder et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,504,363 B1 | 1/2003 | Dogaru et al. |
| 6,525,531 B2 | 2/2003 | Forrest et al. |
| 6,528,992 B2 | 3/2003 | Shinjo et al. |
| 6,542,068 B1 | 4/2003 | Drapp et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,566,862 B1 | 5/2003 | Goto et al. |
| 6,566,872 B1 | 5/2003 | Sugitani |
| 6,590,804 B1 | 7/2003 | Perner |
| 6,622,012 B2 | 9/2003 | Bilotti et al. |
| 6,640,451 B1 | 11/2003 | Vinarcik |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,759,843 B2 | 7/2004 | Furlong |
| 6,768,301 B1 | 7/2004 | Hohe et al. |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 6,969,988 B2 | 11/2005 | Kakuta et al. |
| 7,023,205 B1 | 4/2006 | Krupp |
| 7,026,808 B2 | 4/2006 | Vig et al. |
| 7,030,606 B2 | 4/2006 | Kato et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,085,119 B2 | 8/2006 | Bilotti et al. |
| 7,112,955 B2 | 9/2006 | Buchhold |
| 7,112,957 B2 | 9/2006 | Bicking |
| 7,119,538 B2 | 10/2006 | Blossfeld |
| 7,126,327 B1 | 10/2006 | Busch |
| 7,132,825 B2 | 11/2006 | Martin |
| 7,159,556 B2 | 1/2007 | Yoshihara |
| 7,184,876 B2 | 2/2007 | Tuelings et al. |
| 7,190,784 B2 | 3/2007 | Li |
| 7,193,412 B2 | 3/2007 | Freeman |
| 7,199,579 B2 | 4/2007 | Scheller et al. |
| 7,235,968 B2 | 6/2007 | Popovic et al. |
| 7,250,760 B2 | 7/2007 | Ao |
| 7,259,545 B2 | 8/2007 | Stauth et al. |
| 7,259,556 B2 | 8/2007 | Popovic et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,307,824 B2 | 12/2007 | Bilotti et al. |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,714,570 B2 | 5/2010 | Thomas et al. |
| 7,729,675 B2 | 6/2010 | Krone |
| 7,746,056 B2 | 6/2010 | Stauth et al. |
| 7,746,065 B2 | 6/2010 | Pastre et al. |
| 7,759,929 B2 | 7/2010 | Forsyth |
| 7,764,118 B2 | 7/2010 | Kusuda et al. |
| 7,768,083 B2 | 8/2010 | Doogue et al. |
| 7,769,110 B2 | 8/2010 | Momtaz |
| 7,772,838 B2 | 8/2010 | Bailey et al. |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,872,322 B2 | 1/2011 | Schott et al. |
| 7,911,203 B2 | 3/2011 | Thomas et al. |
| 7,915,886 B2 | 3/2011 | Stolfus et al. |
| 7,923,996 B2 | 4/2011 | Doogue et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,965,076 B2 | 6/2011 | Schott |
| 7,990,209 B2 | 8/2011 | Romero |
| 7,994,774 B2 | 8/2011 | Thomas et al. |
| 8,030,918 B2 | 10/2011 | Doogue et al. |
| 8,058,870 B2 | 11/2011 | Sterling |
| 8,063,631 B2 | 11/2011 | Fermon et al. |
| 8,063,634 B2 | 11/2011 | Sauber et al. |
| 8,080,993 B2 | 12/2011 | Theuss et al. |
| 8,089,276 B2 | 1/2012 | Kentsch |
| 8,106,649 B2 | 1/2012 | Kaita et al. |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,362,579 B2 | 1/2013 | Theuss et al. |
| 8,542,010 B2 | 9/2013 | Cesaretti et al. |
| 8,559,139 B2 | 10/2013 | Theuss |
| 8,577,634 B2 | 11/2013 | Donovan et al. |
| 8,610,430 B2 | 12/2013 | Werth et al. |
| 8,624,588 B2 | 1/2014 | Vig et al. |
| 8,629,539 B2 | 1/2014 | Milano et al. |
| 8,680,846 B2 | 3/2014 | Cesaretti et al. |
| 8,723,512 B1 | 5/2014 | Burdette et al. |
| 8,754,640 B2 | 6/2014 | Vig et al. |
| 8,773,124 B2 | 7/2014 | Ausserlechner |
| 8,860,404 B2 | 10/2014 | Dwyer et al. |
| 9,081,041 B2 | 7/2015 | Friedrich et al. |
| 9,116,018 B2 | 8/2015 | Frachon |
| 9,164,156 B2 | 10/2015 | Elian et al. |
| 9,201,122 B2 | 12/2015 | Cesaretti et al. |

(56) References Cited

U.S. PATENT DOCUMENTS

| | | |
|---|---|---|
| 9,201,123 B2 | 12/2015 | Elian et al. |
| 9,347,799 B2 | 5/2016 | Nazarian et al. |
| 9,411,025 B2 | 8/2016 | David et al. |
| 9,719,806 B2 | 8/2017 | Foletto et al. |
| 9,720,054 B2 | 8/2017 | Drouin et al. |
| 9,810,519 B2 | 11/2017 | Taylor et al. |
| 9,823,090 B2 | 11/2017 | Foletto et al. |
| 9,823,092 B2 | 11/2017 | David et al. |
| 10,041,810 B2 | 8/2018 | Vig et al. |
| 10,234,513 B2 | 3/2019 | Vig et al. |
| 10,408,892 B2 | 9/2019 | David et al. |
| 2001/0002791 A1 | 6/2001 | Tsuge et al. |
| 2001/0009367 A1 | 7/2001 | Seitzer et al. |
| 2001/0026153 A1 | 10/2001 | Nakamura et al. |
| 2002/0027488 A1 | 3/2002 | Hayat-Dawoodi et al. |
| 2002/0084923 A1 | 7/2002 | Li |
| 2002/0097639 A1 | 7/2002 | Ishizaki et al. |
| 2003/0001563 A1 | 1/2003 | Turner |
| 2003/0038675 A1 | 2/2003 | Gailus et al. |
| 2003/0062891 A1 | 4/2003 | Slates |
| 2003/0102909 A1 | 6/2003 | Motz |
| 2003/0107366 A1 | 6/2003 | Busch et al. |
| 2003/0151406 A1 | 8/2003 | Wan et al. |
| 2003/0173955 A1 | 9/2003 | Uenoyama |
| 2003/0222642 A1 | 12/2003 | Butzmann |
| 2003/0227286 A1 | 12/2003 | Dunisch et al. |
| 2004/0032251 A1 | 2/2004 | Zimmerman et al. |
| 2004/0046248 A1 | 3/2004 | Waelti et al. |
| 2004/0056647 A1 | 3/2004 | Stauth et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0170052 A1 | 9/2004 | Inui |
| 2004/0174164 A1 | 9/2004 | Ao |
| 2004/0184196 A1 | 9/2004 | Jayasekara |
| 2004/0189285 A1 | 9/2004 | Uenoyama |
| 2004/0196045 A1 | 10/2004 | Larsen |
| 2004/0252563 A1 | 12/2004 | Hokuto et al. |
| 2004/0263014 A1 | 12/2004 | Miya |
| 2005/0017709 A1 | 1/2005 | Stolfus et al. |
| 2005/0120782 A1 | 6/2005 | Kishibata et al. |
| 2005/0122095 A1 | 6/2005 | Dooley |
| 2005/0122099 A1 | 6/2005 | Imamoto et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0280411 A1 | 12/2005 | Bicking |
| 2006/0011999 A1 | 1/2006 | Schott et al. |
| 2006/0028204 A1 | 2/2006 | Oohira |
| 2006/0033487 A1 | 2/2006 | Nagano et al. |
| 2006/0038559 A1 | 2/2006 | Lamb et al. |
| 2006/0038561 A1 | 2/2006 | Honkura et al. |
| 2006/0068237 A1 | 3/2006 | Murphy |
| 2006/0097715 A1 | 5/2006 | Oohira et al. |
| 2006/0097717 A1 | 5/2006 | Tokuhara et al. |
| 2006/0125473 A1 | 6/2006 | Frachon et al. |
| 2006/0175674 A1 | 8/2006 | Taylor |
| 2006/0181263 A1 | 8/2006 | Doogue et al. |
| 2006/0202692 A1 | 9/2006 | Tatschl et al. |
| 2006/0238190 A1 | 10/2006 | Ishio |
| 2006/0261801 A1 | 11/2006 | Busch |
| 2007/0110199 A1 | 5/2007 | Momtaz et al. |
| 2007/0170533 A1 | 7/2007 | Doogue et al. |
| 2007/0247141 A1 | 10/2007 | Pastre et al. |
| 2007/0285089 A1 | 12/2007 | Ibuki et al. |
| 2007/0290682 A1 | 12/2007 | Oohira et al. |
| 2008/0012558 A1 | 1/2008 | Rossler et al. |
| 2008/0013298 A1 | 1/2008 | Sharma et al. |
| 2008/0094055 A1 | 4/2008 | Monreal et al. |
| 2008/0116884 A1 | 5/2008 | Rettig et al. |
| 2008/0116885 A1 | 5/2008 | Van Zon et al. |
| 2008/0137784 A1 | 6/2008 | Krone |
| 2008/0237818 A1 | 10/2008 | Engel et al. |
| 2008/0238410 A1 | 10/2008 | Charlier et al. |
| 2009/0001964 A1 | 1/2009 | Strzalkowski |
| 2009/0001965 A1 | 1/2009 | Ausserlechner et al. |
| 2009/0001972 A1 | 1/2009 | Fernandez et al. |
| 2009/0009163 A1 | 1/2009 | Yamada |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0121707 A1 | 5/2009 | Schott |
| 2009/0137398 A1 | 5/2009 | Bozovic et al. |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0167301 A1 | 7/2009 | Ausserlechner |
| 2009/0168286 A1 | 7/2009 | Berkley et al. |
| 2009/0174395 A1 | 7/2009 | Thomas et al. |
| 2009/0189600 A1 | 7/2009 | Kurkovskiy |
| 2009/0206827 A1 | 8/2009 | Aimuta et al. |
| 2009/0206831 A1 | 8/2009 | Fermon et al. |
| 2009/0212765 A1 | 8/2009 | Doogue et al. |
| 2009/0243601 A1 | 10/2009 | Feldtkeller |
| 2009/0251134 A1 | 10/2009 | Uenoyama |
| 2009/0256552 A1 | 10/2009 | Guo et al. |
| 2009/0262466 A1 | 10/2009 | Kurata et al. |
| 2009/0315543 A1 | 12/2009 | Guo et al. |
| 2009/0322325 A1 | 12/2009 | Ausserlechner |
| 2009/0326860 A1 | 12/2009 | Hainz et al. |
| 2010/0026279 A1 | 2/2010 | Vig et al. |
| 2010/0026288 A1 | 2/2010 | Sauber et al. |
| 2010/0033175 A1 | 2/2010 | Boeve et al. |
| 2010/0045268 A1 | 2/2010 | Kilian |
| 2010/0052667 A1 | 3/2010 | Kohama et al. |
| 2010/0072988 A1 | 3/2010 | Hammerschmidt et al. |
| 2010/0141249 A1 | 6/2010 | Ararao et al. |
| 2010/0156397 A1 | 6/2010 | Yabusaki et al. |
| 2010/0164491 A1 | 7/2010 | Kejik et al. |
| 2010/0188078 A1 | 7/2010 | Foletto et al. |
| 2010/0201356 A1 | 8/2010 | Koller et al. |
| 2010/0211347 A1 | 8/2010 | Friedrich et al. |
| 2010/0237450 A1 | 9/2010 | Doogue et al. |
| 2010/0276769 A1 | 11/2010 | Theuss et al. |
| 2010/0295140 A1 | 11/2010 | Theuss et al. |
| 2010/0330708 A1 | 12/2010 | Engel et al. |
| 2011/0004278 A1 | 1/2011 | Aghassian et al. |
| 2011/0018533 A1 | 1/2011 | Cesaretti et al. |
| 2011/0031960 A1 | 2/2011 | Hohe et al. |
| 2011/0048102 A1 | 3/2011 | Fernandez et al. |
| 2011/0074405 A1 | 3/2011 | Doogue et al. |
| 2011/0127998 A1 | 6/2011 | Elian et al. |
| 2011/0175605 A1 | 7/2011 | Kim et al. |
| 2011/0224537 A1 | 9/2011 | Brunner |
| 2011/0248708 A1 | 10/2011 | Thomas et al. |
| 2011/0267040 A1 | 11/2011 | Frachon |
| 2011/0285384 A1 | 11/2011 | Nomura |
| 2011/0291650 A1 | 12/2011 | Franke et al. |
| 2011/0298448 A1 | 12/2011 | Foletto et al. |
| 2012/0007589 A1 | 1/2012 | Okada |
| 2012/0013333 A1 | 1/2012 | Ararao et al. |
| 2012/0019236 A1 | 1/2012 | Tiernan et al. |
| 2012/0062215 A1 | 3/2012 | Ide et al. |
| 2012/0086090 A1 | 4/2012 | Sharma et al. |
| 2012/0200290 A1 | 8/2012 | Ausserlechner |
| 2012/0249133 A1 | 10/2012 | Friedrich |
| 2012/0274314 A1 | 11/2012 | Cesaretti et al. |
| 2012/0293167 A1 | 11/2012 | Kitanaka et al. |
| 2012/0303305 A1 | 11/2012 | Bergqvist et al. |
| 2013/0015845 A1 | 1/2013 | Fox |
| 2013/0057257 A1 | 3/2013 | Friedrich et al. |
| 2013/0113474 A1 | 5/2013 | Elian |
| 2013/0214774 A1 | 8/2013 | Cesaretti et al. |
| 2013/0238278 A1 | 9/2013 | Shoemaker et al. |
| 2013/0241543 A1 | 9/2013 | Stenson et al. |
| 2013/0249546 A1 | 9/2013 | David et al. |
| 2013/0265037 A1 | 10/2013 | Friedrich et al. |
| 2013/0278246 A1 | 10/2013 | Stegerer et al. |
| 2013/0300401 A1 | 11/2013 | Krapf et al. |
| 2013/0320970 A1 | 12/2013 | Foletto et al. |
| 2013/0335069 A1 | 12/2013 | Vig et al. |
| 2014/0084906 A1 | 3/2014 | Ruigrok et al. |
| 2014/0175584 A1 | 6/2014 | Foletto et al. |

(56) References Cited

U.S. PATENT DOCUMENTS

| | | |
|---|---|---|
| 2014/0176126 A1 | 6/2014 | Friedrich et al. |
| 2014/0232379 A1 | 8/2014 | Nazarian et al. |
| 2014/0266176 A1 | 9/2014 | Fernandez et al. |
| 2014/0266181 A1 | 9/2014 | Milano et al. |
| 2014/0305761 A1 | 10/2014 | Kimes |
| 2014/0327435 A1 | 11/2014 | Röhrer |
| 2014/0347044 A1 | 11/2014 | Monreal et al. |
| 2015/0022186 A1 | 1/2015 | Ausserlechner |
| 2015/0022187 A1 | 1/2015 | Taylor et al. |
| 2015/0022193 A1 | 1/2015 | Burdette et al. |
| 2015/0022197 A1 | 1/2015 | David et al. |
| 2015/0022198 A1 | 1/2015 | David et al. |
| 2015/0211895 A1 | 7/2015 | Reitsma et al. |
| 2015/0346289 A1 | 12/2015 | Ausserlechner |
| 2015/0377648 A1 | 12/2015 | Sirohiwala et al. |
| 2016/0025820 A1 | 1/2016 | Scheller et al. |
| 2016/0069662 A1 | 3/2016 | Mullenix et al. |
| 2016/0123774 A1 | 5/2016 | Foletto et al. |
| 2017/0271399 A1 | 9/2017 | Lee et al. |
| 2017/0285117 A1 | 10/2017 | Drouin et al. |
| 2017/0307696 A1 | 10/2017 | Werth et al. |
| 2017/0314907 A1 | 11/2017 | Taylor et al. |
| 2017/0328739 A1 | 11/2017 | David et al. |
| 2017/0356760 A1 | 12/2017 | David et al. |
| 2018/0011150 A1 | 1/2018 | Pepka et al. |
| 2018/0340911 A1 | 11/2018 | Romero et al. |
| 2018/0340986 A1 | 11/2018 | Latham et al. |
| 2018/0340988 A1 | 11/2018 | Latham et al. |
| 2018/0340989 A1 | 11/2018 | Latham et al. |
| 2019/0033096 A1 | 1/2019 | David et al. |
| 2019/0162784 A1 * | 5/2019 | Lassalle-Balier ...... G01R 33/09 |

FOREIGN PATENT DOCUMENTS

| | | |
|---|---|---|
| CN | 102483443 | 5/2012 |
| CN | 102713654 | 10/2012 |
| CN | 102954808 | 3/2013 |
| DE | 2518054 | 11/1976 |
| DE | 4031560 | 4/1992 |
| DE | 19539458 | 4/1997 |
| DE | 68927973 T2 | 9/1997 |
| DE | 19634715 | 3/1998 |
| DE | 19650935 | 6/1998 |
| DE | 19838433 | 3/1999 |
| DE | 19851839 | 11/1999 |
| DE | 19961504 | 6/2001 |
| DE | 10210184 | 9/2003 |
| DE | 10314602 | 10/2004 |
| DE | 102005014509 | 10/2006 |
| DE | 102006037226 | 2/2008 |
| DE | 102007018238 | 10/2008 |
| DE | 102007041230 | 4/2009 |
| DE | 102010016584 | 11/2010 |
| DE | 102011102483 | 11/2012 |
| EP | 0146091 | 6/1985 |
| EP | 0289414 A2 | 2/1988 |
| EP | 0289414 A3 | 2/1988 |
| EP | 0357013 A2 | 3/1990 |
| EP | 0357013 A3 | 3/1990 |
| EP | 0361456 A2 | 4/1990 |
| EP | 0361456 A3 | 4/1990 |
| EP | 0504583 | 9/1992 |
| EP | 0629834 A1 | 12/1994 |
| EP | 0631416 B1 | 12/1994 |
| EP | 0680103 A1 | 11/1995 |
| EP | 0875733 A2 | 11/1998 |
| EP | 0944888 B1 | 9/1999 |
| EP | 1306687 A2 | 5/2003 |
| EP | 1443332 A1 | 8/2004 |
| EP | 0898180 B1 | 11/2004 |
| EP | 1580560 A1 | 9/2005 |
| EP | 1637898 A1 | 3/2006 |
| EP | 1662353 A1 | 5/2006 |
| EP | 1679524 A1 | 7/2006 |
| EP | 1850143 A1 | 10/2007 |
| EP | 2000814 | 12/2008 |
| EP | 2063229 | 5/2009 |
| EP | 2402719 | 1/2012 |
| EP | 2466265 A2 | 6/2012 |
| EP | 2730893 | 5/2014 |
| EP | 3410075 | 12/2018 |
| FR | 2748105 | 10/1997 |
| FR | 2909756 | 6/2008 |
| GB | 2135060 | 8/1984 |
| GB | 2276727 | 10/1994 |
| GB | 2481482 | 12/2011 |
| JP | 6148777 | 3/1986 |
| JP | S 6367583 | 3/1988 |
| JP | 363084176 A | 4/1988 |
| JP | 63263782 | 10/1988 |
| JP | 63300911 | 12/1988 |
| JP | H 02149013 | 6/1990 |
| JP | H 0329817 | 2/1991 |
| JP | H 04095817 | 3/1992 |
| JP | 04152688 | 5/1992 |
| JP | H 02116753 | 5/1992 |
| JP | H 06273437 | 9/1994 |
| JP | 0897486 | 4/1996 |
| JP | H 08511348 | 11/1996 |
| JP | 09166612 | 6/1997 |
| JP | 1038988 | 2/1998 |
| JP | 10332725 | 12/1998 |
| JP | H 10318784 | 12/1998 |
| JP | 1174142 | 3/1999 |
| JP | 11064363 | 3/1999 |
| JP | 2000-183241 | 6/2000 |
| JP | 2001-043475 | 2/2001 |
| JP | 2001-141738 | 5/2001 |
| JP | 2001-153683 | 6/2001 |
| JP | 2001-165702 | 6/2001 |
| JP | 2001-1659951 | 6/2001 |
| JP | 2002-117500 | 4/2002 |
| JP | 2002-149013 | 5/2002 |
| JP | 2002-357920 | 12/2002 |
| JP | 2003-042709 | 2/2003 |
| JP | 2003-177171 | 6/2003 |
| JP | 2003-202365 A | 7/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 | 12/2004 |
| JP | 2005-517928 | 6/2005 |
| JP | 2005-241269 | 9/2005 |
| JP | 2005-337866 | 12/2005 |
| JP | 2005-345302 | 12/2005 |
| JP | 2006-003096 | 1/2006 |
| JP | 2006-3116 A | 1/2006 |
| JP | 2006/098059 | 4/2006 |
| JP | 2006-275764 | 10/2006 |
| JP | 2007-012582 A | 1/2007 |
| JP | 2007-218799 | 8/2007 |
| JP | 2007-240202 | 9/2007 |
| JP | 2008-180550 | 8/2008 |
| JP | 2008-264569 | 11/2008 |
| JP | 2008-286667 A | 11/2008 |
| JP | 2009-002911 A | 1/2009 |
| JP | 2009-150732 | 7/2009 |
| JP | 2009-222524 | 10/2009 |
| JP | 2009-250725 A | 10/2009 |
| JP | 2009-250931 A | 10/2009 |
| JP | 2010-014607 | 1/2010 |
| JP | 2010-078366 | 4/2010 |
| JP | 2012-501446 A | 1/2012 |
| WO | WO 88/09026 | 11/1988 |
| WO | WO 93/012403 | 6/1993 |
| WO | WO 94/08203 | 4/1994 |
| WO | WO 94/29672 | 12/1994 |
| WO | WO 95/18982 | 7/1995 |
| WO | WO 96/02849 | 2/1996 |
| WO | WO 98/010302 | 3/1998 |
| WO | WO 9854547 | 12/1998 |
| WO | WO 99/49322 | 9/1999 |
| WO | WO 00/002266 | 1/2000 |

(56) References Cited

FOREIGN PATENT DOCUMENTS

| | | |
|---|---|---|
| WO | WO 01/74139 A2 | 10/2001 |
| WO | WO 01/74139 A3 | 10/2001 |
| WO | WO 03/036732 | 5/2003 |
| WO | WO 03/069358 A2 | 8/2003 |
| WO | WO 03/069358 A3 | 8/2003 |
| WO | WO 03/107018 | 12/2003 |
| WO | WO 2004/025742 | 3/2004 |
| WO | WO 2004/027436 | 4/2004 |
| WO | WO 2004/072672 | 8/2004 |
| WO | WO 2005/013363 | 2/2005 |
| WO | WO 2006/056829 | 6/2006 |
| WO | WO 2006/074989 | 7/2006 |
| WO | WO 2006/083479 | 8/2006 |
| WO | WO 2007/033168 | 3/2007 |
| WO | WO 2007/095971 | 8/2007 |
| WO | WO 2007/138508 | 12/2007 |
| WO | WO 2008/008140 A2 | 1/2008 |
| WO | WO 2008/008140 A3 | 1/2008 |
| WO | WO 2008/048379 | 4/2008 |
| WO | WO 2008/121443 | 10/2008 |
| WO | WO 2008 145662 | 12/2008 |
| WO | WO 2009030361 | 3/2009 |
| WO | WO 2009/108422 A2 | 9/2009 |
| WO | WO 2009/108422 A3 | 9/2009 |
| WO | WO 2009/124969 | 10/2009 |
| WO | WO 2010/014309 | 2/2010 |
| WO | WO 2010/027658 | 3/2010 |
| WO | WO 2010/065315 | 6/2010 |
| WO | WO 2010/096367 | 8/2010 |
| WO | WO 2011/011479 | 1/2011 |
| WO | WO 2012/148646 | 11/2012 |
| WO | WO 2013/169455 | 11/2013 |
| WO | WO 2015/009532 | 1/2015 |
| WO | WO 2015/058733 A1 | 4/2015 |

OTHER PUBLICATIONS

Extended European Search Report dated Apr. 3, 2020 for European Application No. 19198294.1; 20 pages.

Response to Office Action filed May 11, 2020 for U.S. Appl. No. 15/658,757; 15 pages.

Ahn et al., "A New Toroidal-Meander Type Integrated Inductor With a Multilevel Meander Magnetic Core", IEEE Transactions on Magnetics, vol. 30, No. 1, Jan. 1994, 7 pages.

Allegro MicroSystems, Inc.; "3212 Data Sheet: Micropower, Ultra-Sensitive Hall-Effect Switch", published Sep. 22, 2004; 12 pages.

Allegro MicroSystems, Inc.; "3235 Data Sheet: Dual-Output Hall-Effect Switch", http://www.datasheetcatalog.org/datasheets/90/205047_DS.pdf; downloaded Sep. 29, 2010; 6 pages.

Allegro MicroSystems, Inc.; "3425 Data Sheet: Dual, Chopper-Stabilized, Ultra-Sensitive Bipolar Hall-Effect Switch", published Jun. 28, 2002; 10 pages.

Allegro MicroSystems, Inc.; "27701-AN Data Sheet: Hall-Effect IC Applications Guide", Application Information, Rev. 2; http://www.allegromicro.com/en/products/design/hall-effect-sensor-ic-applications-guide/AN27701.pdf; downloaded Sep. 29, 2010; 40 pages.

Allegro MicroSystems, Inc.; "A1140/41/42/43 Data Sheet: Sensitive Two-Wire Chopper-Stabilized Unipolar Hall-Effect Switches", published Sep. 9, 2004;10 pages.

Allegro MicroSystems, Inc.; "A1174 Data Sheet: Ultrasensitive Hall Effect Latch with Internally or Externally Controlled Sample and Sleep Periods for Track Ball and Scroll Wheel Applications", published Jul. 25, 2008; 13 pages.

Allegro MicroSystems, Inc.; "A1230 Data Sheet: Ultra-Sensitive Dual-Channel Quadrature Hall-Effect Bipolar Switch", published Mar. 26, 2010; 16 pages.

Allegro MicroSystems, Inc. "A1341 Data Sheet: High Precision, Highly Programmable Linear Hall Effect Sensor IC with EEPROM, Output Protocols SENT and PWM, and Advanced Output Linearization Capabilities", May 17, 2010; 46 pages.

Allegro MicroSystems, Inc.; "A1351 Data Sheet: High Precision Linear Hall Effect Sensor with a Push/Pull, Pulse Width Modulated Output", published Mar. 7, 2008; 23 pages.

Allegro MicroSystems, Inc., "A1354 Data Sheet: High Precision 2-Wire Linear Hall Effect Sensor IC with a Pulse Width Modulated Output", 22 pages.

Allegro MicroSystems, Inc.; "A1356 Data Sheet: High Precision Linear Hall-Effect Sensor with an Open Drain Pulse Width Modulated Output", 20 pages.

Allegro MicroSystems, Inc.; "A1360, A1361 and A1362 Data Sheet: Low-Noise Programmable Linear Hall Effect Sensors with Adjustable Bandwidth (50 kHz Maximum) and Analog Output", published Mar. 18, 2008; 25 pages.

Allegro MicroSystems, Inc. "Data Sheet ATS601LSG: Non-TPOS, Tooth Detecting Speed Sensor", Nov. 1, 2011; 9 pages.

Allegro "True Zero-Speed Low-Jitter High Accuracy Gear Tooth Sensor", ATS625LSG; 2005; Allegro MicroSystems, Inc. Worcester, MA 01615; 21 pages.

Allegro MicroSystems, Inc. "ATS645LSH Data Sheet: Two-Wire True Zero Speed Miniature Differential Peak-Detecting Gear Tooth Sensor",2004; Allegro MicroSystems, Inc., Worcester, MA 01615; 14 pages.

Allegro MicroSystems, Inc.; "ATS675LSE Data Sheet: Self-Calibrating TPOS Speed Sensor Optimized for Automotive Cam Sensing Applications", published Jul. 11, 2008; 13 pages.

Allegro MicroSystems, Inc., "Gear-Tooth Sensor for Automotive Applications", Aug. 3, 2001, 2 pages.

Allegro MicroSystems, Inc., "Hall-Effect IC Applications Guide", http://www.allegromicro.com/en/Products/Design/an/an27701.pdf, Copyright 1987, 1997, 36 pages.

Atherton et al.; "Sensor Signal Conditioning—an IC Designer's Perspective", IEEE Electro International; Apr. 26-28, 1991; 6 pages.

Ausserlechner et al.; "Compensation of the Piezo-Hall Effect in Integrated Hall Sensors on (100)-Si", IEEE Sensors Journal, vol. 7, No. 11; Nov. 2007; ISBN: 1530-437X; 8 pages.

Ausserlechner et al.; "Drift of Magnetic Sensitivity of Small Hall Sensors Due to Moisture Absorbed by the IC-Package", Proceedings of IEEE Sensors, 2004; vol. 1; Oct. 24, 2004; ISBN:0-7803-8692-2; 4 pages.

Ausserlechner; "Limits of Offset Cancellation by the Principle of Spinning Current Hall Probe", Proceedings of IEEE Sensors; Oct. 2004; 4 pages.

Ausserlechner; "The piezo-Hall effect in n-silicon for arbitrary crystal orientation", Proceedings of IEEE Sensors; vol. 3; Oct. 24, 2004; ISBN: 0-7803-8692-2; 4 pages.

Austria Microsystems; "AS5040 datasheet; 10-Bit Programmable Magnetic Rotary Encoder", Revision 1.1; Jan. 2004; 20 pages.

Bahreyni, et al.; "A Resonant Micromachined Magnetic Field Sensor", IEEE Sensors Journal; vol. 7, No. 9, Sep. 2007; 9 pages.

Banjevic et al; "2D CMOS Integrated Magnetometer Based on the Miniaturized Circular Vertical Hall Device" International Solid-State Sensors, Actuators and Microsystems Conference; Transducers; Jun. 21-25, 2009; pp. 4 pages.

Banjevic; "High Bandwidth CMOS Magnetic Sensors Based on the Miniaturized Circular Vertical Hall Device" Sep. 2011; 153 pages.

Barrettino, et al.; "CMOS-Based Monolithic Controllers for Smart Sensors Comprising Micromembranes and Microcantilevers" IEEE Transactions on Circuits and Systems-I Regular Papers vol. 54, No. 1; Jan. 2007; 12 pages.

Baschirotto et al.; "Development and Analysis of PCB Vector 2-D Magnetic Field Sensor System for Electronic Compass" IEEE Sensors Journal vol. 6, No. 2; Apr. 2006; 7 pages.

Bilotti et al.; "Monolithic Magnetic Hall Sensor Using Dynamic Quadrature Offset Cancellation;" IEEE Journal of Solid-State Circuits; vol. 32, Issue 6; Jun. 1997; 8 pages.

Blanchard et al.; "Cylindrical Hall Device;" International Electron Devices Meeting; Dec. 8-11, 1996; 4 pages.

Bosch, Robert, GMBH Stuttgart; "Active Sensor for ABS/ASR/VDC-Systems with 2-Wire-Current Interface;" Specification TLE4941/TLE4942; Version 5; Jul. 25, 2000; 44 pages.

Bowers et al.; "Microfabrication and Process Integration of Powder-Based Permanent Magnets;" Technologies for Future Micro-Nano Manufacturing Workshop; Aug. 2011; 4 pages.

(56) References Cited

OTHER PUBLICATIONS

Burger et al.; "New fully integrated 3-D silicon Hall sensor for precise angular-position measurements;" Sensors and Actuators, A 67; May 1998; 5 pages.
Daughton "Spin-Dependent Sensors" Proceedings of the IEEE, vol. 91, No. 5, May 2003; 6 pages.
Demierre, et al.; "Reference Magnetic Actuator for Self-Calibration of a Very Small Hall Sensor Array;" Sensors and Actuators A97-98; Apr. 2002; 8 pages.
Drljaca, et al.; "Nonlinear Effects in Magnetic Angular Position Sensor With Integrated Flux Concentrator;" Proc. 23rd International Conference on Microelectronics (MIEL 2002); vol. 1; NIS; Yugoslavia; May 12-15, 2002; 4 pages.
Dwyer, "Back-Biased Packaging Advances (SE, SG & SH versus SA & SB)," http://www.allegromicro.com/en/Products/Design/packaging_advances/index.asp, Copyright 2008, 5 pages.
Dwyer; Allegro MicroSystems, Inc.; "AN296061 Data Sheet: Ring Magnet Speed Sensing for Electronic Power Steering;" published Jul. 21, 2009; 4 pages.
Freitas et al.; "Giant magnetoresistive sensors for rotational speed control;" Journal of Applied Physics, vol. 85, No. 8; Apr. 15, 1999; 3 pages.
Frick, et al.; "CMOS Microsystem for AC Current Measurement with Galvanic Isolation;" IEEE Sensors Journal; vol. 3, No. 6; Dec. 2003; 9 pages.
Gerhauser, H., "Intelligente 3D-Magnetfeld Sensorik;" Fraunhofer-Institut for Integrierte Schaltungen IIS; www.iis.fraunhofer.de/asic/analog; Oct. 2009; 12 pages.
Gilbert; "Technical Advances in Hall-Effect Sensing;" Allegro MicroSystems, Inc. Product Description; May 10, 2008; 7 pages.
Häberli et al.; "Contactless Angle Measurements by CMOS Magnetic Sensor with on Chip Read-Out Circuit;" the 8th International Conference on Solid-State Sensors and Actuators and Eurosensors IX; Jan. 25-29, 1995; 4 pages.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; 6 pages.
Halg; "Piezo-Hall Coefficients of n-Type Silicon;" Journal of Applied Physics; vol. 64, No. 1; Jul. 1, 1988; 7 pages.
Hiligsmann et al.; "Monolithic 360 Degrees Rotary Position Sensor IC;"2004 IEEE Proceedings of Sensors, vol. 3; Oct. 24-27, 2004; 6 pages.
Honeywell International, Inc., "Hall Effect Sensing and Application", Micro Switch Sensing and Control, Chapter 3, http://content.honeywell.com/sensing/prodinfo/solidstate/technical/hallbook.pdf, date unavailable, 11 pages.
Hosticka; "CMOS Sensor Systems;" Sensors and Actuators A66; Apr. 1998; 7 pages.
Infineon Product Brief, TLE 4941plusC, "Differential Hall IC for Wheel Speed Sensing", Oct. 2010, www.infineon.com/sensors, 2 pages.
Infineon Technologies; "Differential Two-Wire Hall Effect Sensor IC;" TLE4942 Preliminary Data Sheet; Jun. 2000; 13 pages.
Johnson et al., "Hybrid Hall Effect Device," Appl. Phys. Lett., vol. 71, No. 7, Aug. 1997, 3 pages.
Kanda et al.; "The Piezo-Hall Effect in n-Silicon;" 22nd International Conference on the Physics of Semiconductors; vol. 1, Jan. 1995; 4 pages.
Kapser et al.; "Integrated GMR Based Wheel Speed Sensor for Automotive Applications;" IEEE 2007 Conference on Sensors; Oct. 2007; 4 pages.
Kejik et al.; "Circular Hall Transducer for Angular Position Sensing;" International Solid-State Sensors, Actuators and Microsystems Conference; Transducers; Jun. 2007; 4 pages.
Kejik, P. et al.; "Purely CMOS Angular Position Sensor Based on a New Hall Microchip;" 34th Annual Conference of IEEE Industrial Electronics; IECON; Nov. 10-13, 2008; 5 pages.
Kejik, P.et al.; "Ultra Low-Power Angular Position Sensor for High-Speed Portable Applications;" 2009 IEEE Sensors Conference; Oct. 25-28, 2009; 4 pages.
Krammerer et al.: "A Hall effect sensors network insensitive to mechanical stress;" Proceedings of IEEE Sensors; vol. 3, Oct. 2004; 4 pages.
Lagorce et al.; "Magnetic and Mechanical Properties of Micromachined Strontium Ferrite/Polyimide Composites;" Journal of Microelectromechanical Systems; vol. 6, No. 4; Dec. 1997; 15 pages.
Lequesne et al.; "High-Accuracy Magnetic Position Encoder Concept;" IEEE Transactions on Industry Applications; vol. 35, No. 3; May/Jun. 1999; 9 pages.
Lou Law; "Angular Position Sensing with 2-Axis Hall ICs;" Sensors Magazine, vol. 20, No. 3; Mar. 2003; 7 pages.
Magnani et al.; "Mechanical Stress Measurement Electronics Based on Piezo-Resistive and Piezo-Hall Effects;" 9th International Conference on Electronics, Circuits and Systems 2002; vol. 1; SBN: 0-7803-7596-3; Dec. 2002; 4 pages.
Manic; "Drift in Silicon Integrated Sensors and Circuits Due to the Thermo-Mechanical Stresses;" Lausanne, École Polytechnique Fédérale De Lausanne 2000; Part 1 of 2; 74 pages.
Manic; "Drift in Silicon Integrated Sensors and Circuits Due to the Thermo-Mechanical Stresses;" Lausanne, École Polytechnique Fédérale De Lausanne 2000; Part 2 of 2; 102 pages.
Manic; "Short and Long-Term Stability Problems of Hall Plates in Plastic Packages;" IEEE 38th Annual International Reliability Physics Symposium; Apr. 2000; 6 pages.
Masson et al.; "Multiturn and high precision through-shaft magnetic sensors;" Sensor + Text Conference; Proceedings II; May 2009; 6 pages.
Melexis Microelectronic Integrated Systems; MLX90333; "Triaxis 3D-Joystick Position Sensor;" Data Sheet; Mar. 2009; 43 pages.
Melexis Microelectronic Systems, Hall Applications Guide, Section 3—Applications,1997, 48 pages.
Melexis MLX 90324; ""Under-the-Hood" Triaxis Rotary Position feat. SENT Protocol;" 3901090324 Data Sheet; Dec. 2008; 40 pages.
Memsic Corporation; AN-00MM-001; "Magnetometer Fundamentals;" Jun. 2008; 6 pages.
Memsic Corporation; AN-00MM-002; "Magnetometer Soldering Methodology;" Jun. 2008; 2 pages.
Memsic Corporation; AN-00MM-003; "Magnetic Sensor Calibration;" Mar. 2008; 5 pages.
Memsic Corporation; AN-00MM-004; "Electronic Tilt Compensation;" Mar. 2008; 5 pages.
Memsic Corporation; AN-00MM-005; "Magnetic Sensor Placement Guidelines;" Oct. 2008; 2 pages.
Memsic Corporation; MMC312xMQ; "Tri-axis Magnetic Sensor, with I²C Interface;" Aug. 14, 2008; 9 pages.
Memsic Corporation; MMC314xMQ; "Ultra Small 3-axis Magnetic Sensor, with I²C Interface;" Mar. 31, 2010; 8 pages.
Metz et al.; "Contactless Angle Measurement Using Four Hall Devices on Single Chip;"; International Conference on Solid State Sensors and Actuators; Transducers; vol. 1; Jun. 16-19, 1997; 4 pages.
Micronas GmbH; "HAL® 3625 Programmable Direct Angle Sensor;" Product Information; Sep. 2009; 2 pages.
Motz, et al.; "An Integrated Hall Sensor Platform Design for Position, Angle and Current Sensing;" IEEE Sensors 2006; Exco, Daegu, Korea / Oct. 22-25, 2006; 4 pages.
Motz et al.; "An Integrated Magnetic Sensor with Two Continuous-Time ΔΣ-Converters and Stress Compensation Capability;" IEEE International Solid-State Circuits Conference; Digest of Technical Papers; Feb. 6, 2006; ISBN: 1-4244-0079-1; 7 pages.
Motz, et al.; "A Chopped Hall Sensor with Small Jitter and Programmable "True Power-On" Function;" IEEE Journal of Solid-State Circuits; vol. 40, No. 7; Jul. 2005; 8 pages.
Munter; "A Low-offset Spinning-current Hall Plate;" Sensors and Actuators, vol. A21-A23; Jan. 1990; 4 pages.
Munter; "Electronic Circuitry for a Smart Spinning-current Hall Plate with Low Offset;" Sensors and Actuators A; Jun. 1991;.5 pages.
Novotechnik Siedle Group; "How New Angular Positioning Sensor Technology Opens a Broad Range of New Applications;" Vert-X Technology; Dec. 2001; 5 pages.

(56) References Cited

OTHER PUBLICATIONS

Oniku et al., "High-Energy-Density Permanent Micromagnets Formed From Heterogeneous Magnetic Powder Mixtures", Interdisciplinary Microsystems Group, Dept. of Electrical and Computer Engineering, University of Florida, Gainesville, FL 32611, USA; Preprint of MEMS 2012 Conf. Paper, 4 pages.
Paranjape et al.; "A CMOS-compatible 2-D vertical Hall magnetic-field sensor using active carrier confinement and post-process micromachining;" The 8$^{th}$ International Conference on Solid-State Sensors and Acutators, Physical vol. 53, Issues 1-3; May 1996; 6 pages.
Park et al.: "Batch-Fabricated Microinductors with Electroplated Magnetically Anisotropic and Laminated Alloy Cores", IEEE Transactions on Magnetics, vol. 35, No. 5, Sep. 1999, 10 pages.
Park et al.; "Ferrite-Based Integrated Planar Inductors and Transformers Fabricated at Low Temperature;" IEEE Transactions on Magnetics; vol. 33, No. 5; Sep. 1997; 3 pages.
Partin et al.; "Temperature Stable Hall Effect Sensors;" IEEE Sensors Journal, vol. 6, No. 1; Feb. 2006; 5 pages.
Pastre, et al.; "A Hall Sensor Analog Front End for Current Measurement with Continuous Gain Calibration;" IEEE Sensors Journal; vol. 7, No. 5; May 2007; 8 pages.
Pastre, et al.; "A Hall Sensor-Based Current Measurement Microsystem With Continuous Gain Calibration;" Research in Microelectronics and Electronics, IEEE vol. 2; Jul. 25; 2005; ISBN: 0-7803-9345-7; 4 pages.
Petoussis et al.; "A Novel Hall Effect Sensor Using Elaborate Offset Cancellation Method;" Sensors & Transducers Journal, vol. 100, Issue 1; Jan. 2009; 7 pages.
Petrie; "Circular Vertical Hall Magnetic Field Sensing Element and Method with a Plurality of Continuous Output Signals;" U.S. Appl. No. 13/035,243, filed Feb. 25, 2011; 56 pages.
Popovic; "Not-plate-like Hall magnetic sensors and their applications;" Sensors and Actuators A: Physical, vol. 85, Issues 1-3; Aug. 2000; 9 pages.
Popovic; "Sensor Microsystems;" Proc. 20$^{th}$ International Conference on Microelectronics (MWIL 95); vol. 2, NIS, Serbia, Sep. 12-14, 1995; 7 pages.
Randhawa; "Monolithic Integrated Hall Devices in Silicon Circuits;" Microelectronics Journal; vol. 12, No. 6; Sep. 14-17, 1981; 6 pages.
Reymond, S. et al.; "True 2D CMOS Integrated Hall Sensor," 2007 IEEE Sensors Conference; Oct. 28-31, 2007; 4 pages.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; 4 pages.
Roumenin; "Magnetic sensors continue to advance towards perfection;" Sensors and Actuators A: Physical, vol. 46-47, Issues 1-3; Jan.-Feb. 1995; 7 pages.
Ruther et al.; "Integrated CMOS-Based Sensor Array for Mechanical Stress Mapping;" 5$^{th}$ IEEE Conference on Sensors, Oct. 2007; 4 pages.
Ruther et al.; "Thermomagnetic Residual Offset in Integrated Hall Plates;" IEEE Sensors Journal; vol. 3, No. 6; Dec. 2003; 7 pages.
Sargent; "Switched-capacitor IC controls feedback loop;" EDN; Design Ideas; Feb. 17, 2000; 2 pages.
Schneider et al.; "Temperature Calibration of CMOS Magnetic Vector Probe for Contactless Angle Measurement System;" International Electron Devices Meeting; Dec. 8-11, 1996; 4 pages.
Schott et al.; "Linearizing Integrated Hall Devices;" 1997 International Conference on Solid-State Sensors and Actuators, Jun. 16-19, 1997; 4 pages.
Schott, et al.; "CMOS Single-Chip Electronic Compass with Microcontroller;" IEEE Journal of Solid-State Circuits; vol. 42, No. 12; Dec. 2007; 11 pages.
SENSIMA technology sa; "CVHD: a new concept of Angular Position Sensor;" Slide Presentation for Allegro MicroSystems; Mar. 2009; 17 pages.

Sentron; AN-101; "Angular position sensing with 2-Axis Hall IC 2SA-10;" Feb. 12, 2004; http://www.diegm.uniud.it/petrella/Azionamenti%20Elettrici%2011/Sensori%20e%20trasduttori/Data%20Sheet%20-%202SA-10.pdf; 7 pages.
Simon et al.; "Autocalibration of Silicon Hall Devices;" 8$^{th}$ International Conference on Solid-State Sensors and Actuators; vol. 2; Jun. 25, 1995; 4 pages.
Smith et al.; "Low Magnetic Field Sensing with GMR Sensors;" Sensor Magazine; Part 1; Sep. 1999; http://archives.sensorsmag.com/articles/0999/76mail.shtml; 8 pages.
Smith et al.; "Low Magnetic Field Sensing with GMR Sensors;" Sensor Magazine; Part 2; Oct. 1999; http://archives.sensorsmag.com/articles/1099/84/mail.shtml; 11 pages.
Steiner et al.; "Double-Hall Sensor with Self-Compensated Offset;" International Electron Devices Meeting; Dec. 7, 1997; ISBN: 0-7803-4100-7; 4 pages.
Steiner et al; "Offset Reduction in Hall Devices by Continuous Spinning Current Method" Sensors and Actuators A66; 1998; 6 pages.
Stellrecht et al.; Characterization of Hygroscopic Swelling Behavior of Mold Compounds and Plastic Packages; IEEE Transactions on Components and Packaging Technologies; vol. 27, No. 3; Sep. 2004; 8 pages.
Tian et al.; "Multiple Sensors on Pulsed Eddy-Current Detection for 3-D Subsurface Crack Assessment;" IEEE Sensors Journal, vol. 5, No. 1; Feb. 2005; 7 pages.
Trontelj et al; "CMOS Integrated Magnetic Field Source Used as a Reference in Magnetic Field Sensors on Common Substrate;" WEP 1-6; IMTC; May 1994; 3 pages.
van der Meer; et al; "CMOS quad spinning-current Hall-sensor system for compass application;" IEEE Proceedings of Sensors, vol. 3; Oct. 24-27, 2004; 4 pages.
Vogelgesang et al.; Robert Bosch GmbH; "GMR sensors in automotive application;" CS-SNS/ECS Slides Presentation; Mar. 2, 2005; 16 pages.
Voider; "The CORDIC Trigonometric Computing Technique;" The Institute of Radio Engineers, Inc.; IRE Transactions on Electronic Computers, vol. EC, Issue 3; Sep. 1959; 5 pages.
Wu, et al.; "A Chopper Current-Feedback Instrumentation Amplifier with a 1mHz 1/f Noise Corner and an AC-Coupled Ripple-Reduction Loop;" IEEE International Solid-State Circuits Conference; Feb. 10, 2009; 3 pages.
Zou et al.; "Three-Dimensional Die Surface Stress Measurements in Delaminated and Non-Delaminated Plastic Packages;" 48th Electronic Components and Technology Conference; May 25, 1998; 12 pages.
Invitation to Pay Additional fees dated Oct. 2, 2003 for PCT Pat. App. No. PCT/US03/02489; 3 pages.
PCT Search Report dated Nov. 19, 2003 for PCT Pat. App. No. PCT/US03/02489; 9 pages.
EP Board of Appeals Datasheet for the Decision dated Nov. 22, 2007; for European Pat. App. No. 97108803.4; 22 pages.
EP Communication for the Board of Appeals dated Apr. 30, 2009; for European Pat. App. No. 03 710 766.1; 2 pages.
EP Preliminary Opinion from the Board of Appeal dated May 26, 2009; for European Pat. App. No. 03 710 766.1; 52 pages.
Letter from Yuasa and Hara dated Jun. 4, 2008; Japanese First Office Action dated Apr. 7, 2008; for JP Pat. App. No. 2003-568426; 5 pages.
Letter from Yuasa and Hara dated Oct. 21, 2008; Japanese Response to First Office Action filed Sep. 22, 2008; for JP Pat. App. No. 2003-568426; 14 pages.
Letter from Yuasa and Hara dated Dec. 12, 2008; Japanese Second Office Action; for JP Pat. App. No. 2003-568426; 4 pages.
Letter from Yuasa and Hara dated Apr. 23, 2009; Japanese Response to Second Office Action filed Mar. 25, 2009; for JP Pat. App. No. 2003-568426; 8 pages.
Letter from Yuasa and Hara dated Jun. 9, 2011; Japanese Response to Third Office Action filed May 13, 2011; for JP Pat. App. No. 2003-568426; 27 pages.
JP Notice of Allowance dated Nov. 8, 2011; for Japanese Pat. App. No. 2003-568426; 3 pages.

(56) References Cited

OTHER PUBLICATIONS

PCT Search Report and Written Opinion of the ISA dated Jul. 15, 2008 for PCT/US2008/053551; 11 pages.
PCT International Preliminary Report on Patentability for PCT/US2008/053551; dated Oct. 8, 2009; 8 pages.
CN Office Action (with English translation) dated Sep. 10, 2010; for Chinese Pat. App. No. 200880008895.6; 14 pages.
Letter from NTD Patent & Trademark Agency Limited Regarding Office Action dated Oct. 13, 2010; for Chinese Pat. App. No. 200880008895.6; 2 pages.
CN Response to Office Action; for Chinese Pat. App. No. 200880008895.6; 7 pages.
CN Notice of Allowance (with English translation) dated Jul. 4, 2011; for Chinese Pat. App. No. 200880008895.6; 4 pages.
JP First Office Action (English translation); for Japanese Pat. App. No. 2010-501028; 7 pages.
JP Response to First Office Action (with English translation); for Japanese Pat. App. No. 2010-501028; 12 pages.
JP Second Office Action (English translation); for Japanese Pat. App. No. 2010-501028; 7 pages.
Office Action/Restriction Requirement dated May 14, 2010; for U.S. Appl. No. 12/037,393; 6 pages.
Response to Office Action/Restriction Requirement filed Jun. 2, 2010; for U.S. Appl. No. 12/037,393; 1 page.
Office Action dated Jun. 30, 2010; for U.S. Appl. No. 12/037,393; 11 pages.
Response to Office Action filed Oct. 14, 2010; for U.S. Appl. No. 12/037,393; 34 pages.
Notice of Allowance dated Nov. 3, 2010; for U.S. Appl. No. 12/037,393; 7 pages.
Request for Continued Examination dated Jan. 26, 2011; for U.S. Appl. No. 12/037,393; 1 page.
Notice of Allowance dated Feb. 11, 2011; for U.S. Appl. No. 12/037,393; 6 pages.
Search Report dated Oct. 23, 2009 for PCT Application No. PCT/US2009/031776; 20 pages.
International Preliminary Report on Patentability dated Sep. 10, 2010 for Application No. PCT/US2009/031776; 10 pages.
CN First Office Action (with English translation) dated Aug. 29, 2012; for Chinese Pat. App. No. 200980106535.4; 8 pages.
CN Response to Chinese First Office Action with English claims dated Aug. 29, 2012 filed on Jan. 24, 2013; for Chinese Pat. App. No. 200980106535.4; 20 pages.
Letter from NTD Patent and Trademark Office dated Oct. 10, 2012; for Chinese Pat. App. No. 200980106535.4; 2 pages.
Letter to NTD Patent and Trademark Office dated Dec. 11, 2012; for Chinese Pat. App. No. 200980106535.4; 3 pages.
Letter from NTD Patent and Response filed dated Jan. 19, 2013; for Chinese Pat. App. No. 200980106535.4; 13 pages.
CN Second Office Action (with English translation) dated Apr. 15, 2013; for Chinese Pat. App. No. 200980106535.4; 9 pages.
Letter from NTD Patent and Trademark Office dated May 21, 2013; for Chinese Pat. App. No. 200980106535.4; 2 pages.
Letter to NTD Patent and Trademark Agency dated Jun. 19, 2013; for Chinese Pat. App. No. 200980106535.4; 11 pages.
Letter from NTD Patent and Trademark Agency dated Jul. 11, 2013; for Chinese Pat. App. No. 200980106535.4; 1 page.
JP Notice of Reasons for Rejection (English translation) dated Apr. 4, 2013 for Japanese Pat. App. No. 2010-547666; 4 pages.
Letter from Yuasa and Hara dated May 27, 2013; for Japanese Pat. App. No. 2010-547666; 2 pages.
Response to Reason for Rejection with English claims filed Jul. 3, 2013; for Japanese Pat. App. No. 2010-547666; 11 pages.
JP Notice of Reasons for Rejection (English translation) dated Sep. 29, 2014 for Japanese Pat. App. No. 2010-547666; 8 pages.
Response to Reason for Rejection with English claims filed Jan. 27, 2015; for Japanese Pat. App. No. 2010-547666; 10 pages.
Office Action dated Feb. 2, 2011; for U.S. Appl. No. 12/959,672; 13 pages.
Response to Office Action filed May 24, 2011; for U.S. Appl. No. 12/959,672; 8 pages.
Notice of Allowance dated Jun. 27, 2011; for U.S. Appl. No. 12/959,672; 8 pages.
Request for Continued Examination dated Jul. 13, 2011; for U.S. Appl. No. 12/959,672; 2 pages.
Notice of Allowance dated Jul. 19, 2011; for U.S. Appl. No. 12/959,672; 8 pages.
Office Action dated May 12, 2011; for U.S. Appl. No. 12/183,367; 17 pages.
Response to Office Action filed Aug. 10, 2011; for U.S. Appl. No. 12/183,367; 13 pages.
Office Action dated Oct. 20, 2011; for U.S. Appl. No. 12/183,367; 9 pages.
Response to Office Action filed Jan. 17, 2012; for U.S. Appl. No. 12/183,367; 15 pages.
Office Action/Restriction Requirement dated Apr. 12, 2012; for U.S. Appl. No. 12/183,367; 6 pages.
Response to Restriction Requirement filed May 9, 2012; for U.S. Appl. No. 12/183,367; 2 pages.
Supplemental Response to Office Action/Restriction Requirement filed Feb. 11, 2013; for U.S. Appl. No. 12/183,367;2 pages.
Final Office Action dated May 2, 2013; for U.S. Appl. No. 12/183,367; 15 pages.
Response to Final Office Action filed Jun. 19, 2013; for U.S. Appl. No. 12/183,367; 8 pages.
Final Office Action dated Jul. 1, 2013; for U.S. Appl. No. 12/183,367; 7 pages.
Final Office Action dated Jul. 23, 2013; for U.S. Appl. No. 12/183,367; 8 pages.
Response to Office Action filed Aug. 27, 2013; for U.S. Appl. No. 12/183,367; 13 pages.
Notice of Allowance dated Sep. 6, 2013; for U.S. Appl. No. 12/183,367; 7 pages.
Office Action/Restriction Requirement dated Oct. 23, 2009; for U.S. Appl. No. 12/328,798; 7 pages.
Response to Office Action/Restriction Requirement filed Nov. 4 2009; for U.S. Appl. No. 12/328,798; 1 page.
Office Action dated Dec. 14, 2009; for U.S. Appl. No. 12/328,798; 15 pages.
Response to Office Action filed Jan. 28, 2010; for U.S. Appl. No. 12/328,798; 22 pages.
Final Office Action dated May 24, 2010; for U.S. Appl. No. 12/328,798; 20 pages.
Response to Final Office Action filed Jul. 21, 2010 for U.S. Appl. No. 12/328,798; 23 pages.
Office Action dated Oct. 31, 2011; for U.S. Appl. No. 12/328,798; 12 pages.
Response to Office Action filed Feb. 28, 2012; for U.S. Appl. No. 12/328,798; 15 pages.
Final Office Action dated May 10, 2012; for U.S. Appl. No. 12/328,798; 13 pages.
Response to Final Office Action filed Oct. 9, 2012; for U.S. Appl. No. 12/328,798; 6 pages.
Notice of Allowance dated Oct. 26, 2012; for U.S. Appl. No. 12/328,798; 13 pages.
Request for Continued Examination filed Jan. 24, 2013; for U.S. Appl. No. 12/328,798; 2 pages.
Notice of Allowance dated Mar. 1, 2013; for U.S. Appl. No. 12/328,798; 10 pages.
Office Action dated Feb. 22, 2012; for U.S. Appl. No. 13/241,380; 14 pages.
Response to Office Action filed May 3, 2012; for U.S. Appl. No. 13/241,380; 16 pages.
Final Office Action dated Jul. 19, 2012; for U.S. Appl. No. 13/241,380; 13 pages.
Response to Final Office Action dated Oct. 9, 2012; for U.S. Appl. No. 13/241,380; 6 pages.
Notice of Allowance dated Oct. 29, 2012; for U.S. Appl. No. 13/241,380; 11 pages.
Request for Continued Examination dated Jan. 24, 2013; for U.S. Appl. No. 13/241,380; 3 pages.

(56) References Cited

OTHER PUBLICATIONS

Notice of Allowance dated Feb. 21, 2013; for U.S. Appl. No. 13/241,380; 9 pages.
Office Action dated Jul. 6, 2012; for U.S. Appl. No. 12/706,318; 29 pages.
Response to Office Action filed Sep. 27, 2012; for U.S. Appl. No. 12/706,318; 12 pages.
Supplemental Response to Office Action filed Oct. 2, 2012; for U.S. Appl. No. 12/706,318; 12 pages.
Notice of Allowance dated Dec. 10, 2012; for U.S. Appl. No. 12/706,318; 9 pages.
Letter under 37 C.F.R. §1.56 filed Jul. 25, 2013 for U.S. Appl. No. 13/946,380; 2 pages.
Non-Final Office Action dated Jul. 9, 2015; for U.S. Appl. No. 13/946,380; 31 pages.
Amendment in response to Office Action dated Jul. 9, 2015 filed Nov. 9, 2015 for U.S. Appl. No. 13/946,380; 26 pages.
Final Office Action dated Dec. 15, 2015; for U.S. Appl. No. 13/946,380; 36 pages.
Amendment in response to Final Office Action dated Dec. 15, 2015 and filed Apr. 12, 2016 for U.S. Appl. No. 13/946,380; 17 pages.
Non-Final Office Action dated Aug. 26, 2016 for U.S. Appl. No. 13/946,380; 40 pages.
Response filed Nov. 9, 2016 to the Non-Final Office Action dated Aug. 26, 2016; for U.S. Appl. No. 13/946,380; 19 pages.
Final Office Action dated Jan. 12, 2017 for U.S. Appl. No. 13/946,380; 32 pages.
Amendment filed Apr. 11, 2017 for U.S. Appl. No. 13/946,380; 18 pages.
Non-Final Office Action for U.S. Appl. No. 13/946,380 dated May 19, 2017; 20 pages.
Amendment for U.S. Appl. No. 13/946,380, filed Jun. 22, 2017; 8 pages.
Notice of Allowance dated Jul. 13, 2017 for U.S. Appl. No. 13/946,380; 11 pages.
Amendment Under 37 C.F.R. §1.312 for U.S. Appl. No. 13/946,380, filed Aug. 29, 2017; 3 pages.
DCMD Instruction letter regarding filing regarding Request for Examination dated Feb. 13, 2019 for KR Pat. Appl. No. 10-2016-7004180; 2 pages.
21st Century Letter dated Mar. 14, 2019 regarding Voluntary Amendment and Substantive Examination for KR Pat. Appl. No. 10-2016-7004180; 1 page.
21st Century Listing of Pending Claims filed on Mar. 14, 2019 regarding Voluntary Amendment and Substantive Examination for KR Pat. Appl. No. 10-2016-7004180; 13 pages.
Non-final office action dated Jan. 26, 2018 for U.S. Appl. No. 15/655,135; 49 pages.
Response to Non-Final Office Action dated Jan. 26, 2018 for U.S. Appl. No. 15/655,135; Response filed Apr. 3, 2018; 20 pages.
Final Office Action dated Jul. 26, 2018 for U.S. Appl. No. 15/655,135; 38 pages.
Response to Final Office Action dated Jul. 26, 2018 for U.S. Appl. No. 15/655,135, filed Oct. 11, 2018; 21 pages.
Request for Continued Examination dated Oct. 29, 2018 for U.S. Appl. No. 15/655,135; 3 Pages.
Notice of Allowance dated Dec. 4, 2018 or U.S. Appl. No. 15/655,135; 13 pages.
Supplemental Notice of Allowability dated Jan. 3, 2019 for U.S. Appl. No. 15/655,135; 9 pages.
Supplemental Notice of Allowability dated Jan. 30, 2019 for U.S. Appl. No. 15/655,135; 9 pages.
Supplemental Notice of Allowability dated Feb. 13, 2019 for U.S. Appl. No. 15/655,135; 9 pages.
Office Action dated Jul. 28, 2016 for U.S. Appl. No. 14/529,669; 25 pages.
Response to Office Action filed Oct. 28, 2016 for U.S. Appl. No. 14/529,669; 18 pages.
Final Office Action dated Jan. 9, 2017 for U.S. Appl. No. 14/529,669; 11 pages.
Response to Final Office Action filed Mar. 30, 2017 for U.S. Appl. No. 14/529,669; 12 pages.
Notice of Allowance dated Apr. 20, 2017 for U.S. Appl. No. 14/529,669; 8 Pages.
Request for Continued Examination filed Apr. 24, 2017 for U.S. Appl. No. 14/529,669; 3 pages.
Notice of Allowance dated May 18, 2017 for U.S. Appl. No. 14/529,669; 8 pages.
Amendment under 37 C.F.R. §1.312 filed Jun. 29, 2017 for U.S. Appl. No. 14/529,669; 11 pages.
Response to Rule 312 Communication from USPTO dated Jul. 28, 2017 for U.S. Appl. No. 14/529,669; 2 pages.
PCT International Search Report and Written Opinion of the ISA dated Dec. 23, 2015; For PCT App. No. PCT/US2015/055233; 12 pages.
PCT International Preliminary Report and Written Opinion dated May 11, 2017 for International Application No. PCT/US2015/055233; 8 Pages.
Allowed Specification dated May 6, 2016 for EP Pat. Appl. No. 15787099.9; 71 pages.
Examination report dated May 28, 2018 for European Application No. 15787099.9; 7 Pages.
Response to Examination report dated May 28, 2018 for European Application No. 15787099.9 as filed on Sep. 17, 2018; 15 pages.
Notice of Intention to Grant dated May 27, 2019 for EP Pat. Appl. No. 15787099.9; 7 pages.
Reasons for Rejection with English translation dated Mar. 1, 2019 for JP Pat. Appl. No. 2017-522907; 9 pages.
Yuasa and Hara Letter dated Apr. 1, 2019 regarding Reasons for Rejection and English Claims for JP Pat. Appl. No. 2017-522907; 15 pages.
Response filed on May 29, 2019 for Japanese Patent Application No. 2017-522907 with English Translation; 40 Pages.
Notice of Allowance with English Allowed Claims dated Oct. 31, 2019 for Japanese Application No. 2017-522907; 17 pages.
Office Action dated Jul. 10, 2019 for U.S. Appl. No. 15/658,757; 23 pages.
Response to Office Action dated Sep. 23, 2019 for U.S. Appl. No. 15/658,757; 15 pages.
Final Office Action dated Nov. 21, 2019 for U.S. Appl. No. 15/658,757; 24 pages.
Response to Office Action and Request for Continued Examination (RCE) dated Jan. 17, 2020 for U.S. Appl. No. 15/658,757; 19 pages.
Office Action dated Feb. 12, 2020 for U.S. Appl. No. 15/658,757; 24 pages.
Partial European Search Report dated Dec. 4, 2019 for EP Application No. 19198294.1-1022, 13 Pages.
Office Action dated Oct. 24, 2019 for U.S. Appl. No. 16/136,844; 21 pages.
Response to Office Action filed Jan. 17, 2020 for U.S. Appl. No. 16/136,844; 14 pages.
Final Office Action dated Mar. 2, 2020 for U.S. Appl. No. 16/136,844; 22 pages.
Office Action dated Mar. 20, 2015; for U.S. Appl. No. 13/946,417; 54 pages.
Response to Office Action dated Mar. 20, 2015 and filed Jun. 19, 2015; for U.S. Appl. No. 13/946,417; 15 pages.
Final Office Action dated Aug. 28, 2015; for U.S. Appl. No. 13,946,417; 34 pages.
Response to Final Office Action and Request for Continued Examination dated Nov. 9, 2015; For Appl. No. 13/946,417; 17 pages.
Non-Final Office Action dated Dec. 3, 2015; for U.S. Appl. No. 13/946,417; 29 pages.
Response to Office Action dated Dec. 3, 2015 and filed Mar. 3, 2016; For U.S. Appl. No. 13/946,417; 17 pages.
Final Office Action dated Oct. 6, 2016; for U.S. Appl. No. 13/946,417; 45 pages.
Response to Final Office Action dated Oct. 6, 2016 from U.S. Appl. No. 13/946,417, filed Jan. 24, 2017; 14 Pages.
Office Action dated Mar. 15, 2017 from U.S. Appl. No. 13/946,417; 43 Pages.
Response to Office Action filed Jun. 14, 2017 for U.S. Appl. No. 13/946,417; 10 pages.

(56) References Cited

OTHER PUBLICATIONS

Final Office Action dated Sep. 8, 2017 for U.S. Appl. No. 13/946,417; 56 pages.
Response (with RCE) to Final Office Action dated Sep. 8, 2017 for U.S. Appl. No. 13/946,417; Response with RCE filed Nov. 29, 2017; 16 pages.
Office Action dated Feb. 8, 2018 for U.S. Appl. No. 13/946,417; 37 Pages.
Response to Non-Final Office Action dated Feb. 8, 2018 for U.S. Appl. No. 13/946,417; Response filed Apr. 19, 2018; 14 pages.
Final Office Action dated Jun. 15, 2018 for U.S. Appl. No. 13/946,417; 33 Pages.
Response to Final Office Action dated Jun. 15, 2018 for U.S. Appl. No. 13/946,417, filed Sep. 14, 2018; 15 Pages.
Office Action dated Feb. 7, 2019 for U.S. Appl. No. 13/946,417; 35 pages.
Response to Office Action dated Feb. 7, 2019 for U.S. Appl. No. 13/946,417; Response filed Apr. 22, 2019; 14 pages.
Notice of Allowance dated Sep. 11, 2019 for U.S. Appl. No. 13/946,417; 10 pages.
Supplemental Notice of Allowability dated Oct. 2, 2019 for U.S. Appl. No. 13/946,417; 7 pages.
International Search Report and Written Opinion dated Oct. 28, 2014 for Int'l PCT Application PCT/US2014/044991; 12 pages.
PCT International Preliminary Report and Written Opinion dated Jan. 28, 2016 for International Application No. PCT/US2014/044991; 9 Pages.
Office Action dated Nov. 3, 2016 regarding U.S. Appl. No. 14/529,606; 11 pages.
Response to Office Action filed Jan. 25, 2017 for U.S. Appl. No. 14/529,606; 19 pages.
Notice of Allowance dated Mar. 16, 2017 for U.S. Appl. No. 14/529,606; 9 pages.
Preliminary Amendment filed Apr. 21, 2017 for U.S. Appl. No. 14/529,606; 12 pages.
Request for Continued Examination filed Apr. 21, 2017 for U.S. Appl. No. 14/529,606; 3 pages.
Non-final Office Action dated May 19, 2017 for U.S. Appl. No. 14/529,606; 11 pages.
Response to Office Action filed Jul. 5, 2017 for U.S. Appl. No. 14/529,606; 13 pages.
Notice of Allowance dated Aug. 4, 2017 for U.S. Appl. No. 14/529,606; 9 pages.
Instruction Letter to Yuasa & Hara dated Jul. 30, 2018 instructions to file Voluntary Amendment for Japanese Application No. 2017-522906; 2 Pages.
English translations of Claims on File dated Sep. 20, 2018 for Japanese Application No. 2017-522906; 7 Pages.
Letter from Foreign Associate dated Sep. 20, 2018 reporting voluntary amendment filed for Japanese Application No. 2017-522906; 2 Pages.
Notice of Reason for rejection with English translation dated Oct. 23, 2019 for Japanese Application No. 2017-522906; 5 pages.
Response to Notice of Reason for rejection with English translation dated Dec. 26, 2019 for Japanese Application No. 2017-522906; 16 pages.
Allowed Specification dated Jul. 7, 2016 for EP Pat. Appl. No. 15853626.8; 104 pages.
A.A. Thornton letter dated Nov. 26, 2018 in response to Official Communication dated Jul. 9, 2018 for EP Pat. Appl. No. 15853626.8; 4 pages.
Amended Claims filed on Nov. 26, 2018 for EP Pat. Appl. No. 15853626.8; 4 pages.
Intention to Grant dated Apr. 25, 2019 for EP Pat. Appl. No. 15853626.8-1022; 7 pages.
Communication under Rule 71(3) EPC dated Oct. 10, 2018 for International Application No. 15791066.2; 7 Pages.
Allowed Specification dated May 6, 2016 for International Application No. 15791066.2; 102 Pages.
Notice of Allowance with English Allowed claims dated Jun. 10, 2019 for Japanese Patent Application No. 2017-522908 with English Translation of Allowed Claims; 12 Pages.
Office Action dated Jul. 14, 2016 for U.S. Appl. No. 14/529,594; 94 pages.
Response to Office Action filed Oct. 14, 2016 for U.S. Appl. No. 14/529,594; 29 pages.
Final Office Action dated Jan. 4, 2017 for U.S. Appl. No. 14/529,594; 38 pages.
Response to Final Office Action filed Mar. 31, 2017 for U.S. Appl. No. 14/529,594, 16 pages.
Notice of Allowance dated May 10, 2017 for U.S. Appl. No. 14/529,594; 8 pages.
Preliminary Amendment filed Jun. 16, 2017 for U.S. Appl. No. 15/624,898; 15 pages.
Office Action dated Nov. 28, 2018 for U.S. Appl. No. 15/624,898; 35 Pages.
Response to Office Action dated Nov. 28, 2018 and filed Jan. 11, 2019 for U.S. Appl. No. 15/624,898; 17 pages.
Final Office Action dated Feb. 14, 2019 for U.S. Appl. No. 15/624,898; 30 pages.
Amendment under 37 C.F.R. §1.114 filed Apr. 10, 2019 for U.S. Appl. No. 15/624,898; 19 pages.
Office Action dated Sep. 26, 2019 for U.S. Appl. No. 15/624,898; 10 pages.
Response to Office Action dated Nov. 7, 2019 for U.S. Appl. No. 15/624,898; 14 pages.
Final Office Action dated Jan. 17, 2020 for U.S. Appl. No. 15/624,898; 13 pages.
Response to Final Office Action dated Apr. 9, 2020 for U.S. Appl. No. 15/624,898; 15 pages.
Notice of Allowance dated Apr. 22, 2020 for U.S. Appl. No. 15/624,898; 8 pages.
U.S. Appl. No. 16/683,800, filed Nov. 14, 2019, David et al.
Notice of Allowance dated May 28, 2020 for U.S. Appl. No. 15/658,757; 8 pages.
Response to Office Action and Request for Examination (RCE) filed Jun. 2, 2020 for U.S. Appl. No. 16/136,844; 13 pages.
Notice of Allowance dated Jun. 23, 2020 for U.S. Appl. No. 16/136,844; 9 pages.

* cited by examiner

MAGNETIC FIELD SENSOR HAVING UNEQUALLY SPACED MAGNETIC FIELD SENSING ELEMENTS

CROSS REFERENCE TO RELATED APPLICATIONS

Not Applicable

STATEMENT REGARDING FEDERALLY SPONSORED RESEARCH

Not Applicable.

FIELD OF THE INVENTION

This invention relates generally to magnetic field sensors, and, more particularly, to magnetic field sensors having a substrate with magnetic field sensing elements thereupon that are unequally spaced.

BACKGROUND

Various types of magnetic field sensing elements are known, including Hall Effect elements and magnetoresistance elements. Magnetic field sensors generally include a magnetic field sensing element and other electronic components. Some magnetic field sensors also include a permanent magnet (a hard ferromagnetic object) in a so-called "back biased" arrangement described more fully below. Other magnetic field sensors sense motion of a magnet.

Magnetic field sensors provide an electrical signal representative of a sensed magnetic field. In some embodiments that have the magnet (back-biased arrangements), the sensed magnetic field is a magnetic field generated by the magnet, in which case, in the presence of a moving ferromagnetic object, the magnetic field generated by the magnet and sensed by the magnetic field sensor varies in accordance with a shape or profile of the moving ferromagnetic object. In contrast, magnetic field sensors that sense a moving magnet directly sense variations of magnetic field magnitude and direction that result from movement of the magnet.

Magnetic field sensors (back-biased) are often used to detect movement of features of a ferromagnetic gear, such as gear teeth and/or gear slots or valleys. A magnetic field sensor in this application is commonly referred to as a "gear tooth" sensor.

In some arrangements, the gear (a target object) is placed upon another object, for example, a camshaft in an engine. Thus, it is the rotation of both the target object (e.g., gear) and the other object (e.g., camshaft) that is sensed by detection of the moving features of the gear. Gear tooth sensors are used, for example, in automotive applications to provide information to an engine control processor for ignition timing control, fuel management, anti-lock braking systems, wheel speed sensors, and other operations.

Information provided by the gear tooth sensor to the engine control processor can include, but is not limited to, an absolute angle of rotation of a target object (e.g., a camshaft) as it rotates, a speed of the rotation, and a direction of the rotation. With this information, the engine control processor can adjust the timing of firing of the ignition system and the timing of fuel injection by the fuel injection system.

Many types of magnetic field sensors do not provide an accurate output signal (e.g., indication of absolute angle, speed, or direction of rotation) immediately upon power up, upon movement of the target object from zero rotating speed, and/or upon movement slowing to zero rotating speed, but instead provide an accurate output signal only once the target object has moved through a substantial rotation or is moving with substantial speed. For example, in one type of magnetic field sensor described in U.S. Pat. No. 6,525,531, entitled "Detection of Passing Magnetic Articles while Adapting the Detection Threshold," issued Feb. 25, 2003, a positive digital-to-analog converter (PDAC) and a negative digital-to-analog converter (NDAC) track positive and negative peaks of a magnetic field signal, respectively, for use in generating a threshold signal. A varying magnetic field signal is compared to the threshold signal. However, the outputs of the PDAC and the NDAC may not be accurate indications of the positive and negative peaks of the magnetic field signal until several cycles of the signal (i.e., signal peaks) occur (i.e., until several gear teeth have passed). This type of magnetic field sensor, which generally requires time to become fully accurate, is referred to herein as a so-called "precision rotation detector."

In contrast, a "true power on state" (TPOS) detector can provide an accurate output signal shortly after movement of a target object (e.g., camshaft) from zero rotating speed, or a low rotation speed in some applications of, for example, less than 100 rpm, or also shortly before movement slowing to zero rotating speed. Furthermore, even when the target object is not moving, the TPOS detector can provide an indication of whether the TPOS detector is in front of a tooth or a valley of a gear. However, when the target object is stationary, the conventional TPOS detector is not able to identify an absolute or relative angle of rotation of the target object. The TPOS detector can be used in conjunction with a precision rotation detector within a common integrated circuit, each providing information to the engine control processor at different times. For simplicity, TPOS detectors and precision rotation detectors are shown herein within a common integrated circuit. However, the TPOS detector or the precision rotation detector can also be used alone in separate circuits.

As described above, the conventional TPOS detector provides an accurate output signal with only a small initial rotation of the target object, and before the precision rotation detector can provide an accurate output signal. The TPOS detector can provide information to the engine control processor that can be more accurate than information provided by the precision rotation detector for time periods at the beginning and at the end of rotation of the target object (e.g., start and stop of the engine and camshaft), but which may be less accurate when the object is rotating at speed. For magnetic field sensor arrangements that have both a TPOS detector and a precision rotation detector within a common integrated circuit, when the object is not rotating or rotating slowly, the engine control processor can use the TPOS detector. When rotating at speed, the engine control processor can primarily use rotation information provided by the precision rotation detector. In most conventional applications, once the magnetic field sensor switches to use the precision rotation detector, it does not return to use the TPOS detector until the target object stops rotating or nearly stops rotating.

A conventional TPOS detector is described in U.S. Pat. No. 7,362,094, entitled "Method and Apparatus for Magnetic Article Detection," issued Apr. 22, 2008. The conventional TPOS detector includes a comparator for comparing the magnetic field signal to a fixed, often trimmed, threshold signal. The conventional TPOS detector can be used in conjunction with and can detect rotational information about a TPOS cam (like a gear), which is disposed upon a target object, e.g., an engine camshaft, configured to rotate.

An example of an output signal from a conventional TPOS detector has at least two states, and typically a high and a low state. The state of the conventional TPOS output signal is high at some times and low at other times as the target object rotates, in accordance with features on the TPOS cam (or gear) attached to the target object.

Similarly, an output signal from a conventional precision rotation detector also has at least two states, and typically a high and a low state. The state of the conventional precision rotation detector output signal is high at some times and low at other times as the target object rotates, also in accordance with features on the TPOS cam (or gear) attached to the target object As described above, conventional TPOS detectors have the ability to differentiate a gear tooth from a gear valley (i.e., gear "features"), and to make such detection when the gear is rotating and when the gear is not rotating. In contrast, some conventional precision rotation detectors have the ability to differentiate a gear tooth from a gear valley when the gear is rotating, but not when the gear is stationary. Detectors that can identify a gear tooth from a valley are sometimes referred to as "tooth detectors." Thus, TPOS detectors are usually tooth detectors. Some precision rotation detectors can also be tooth detectors.

While detection of gear teeth can be used by some magnetic field sensors, other magnetic field sensors can sense passing magnetic poles of a ring magnet (i.e., features). Thus, as used herein, the term "feature detector" is used to describe either a tooth detector or a detector of magnetic poles.

Some other conventional precision rotation detectors are unable to differentiate a gear tooth from a valley (or a north pole from a south pole of a ring magnet), but instead, can differentiate an edge of a tooth of the gear from the tooth or the valley. Such detectors are sometimes referred to as "edge detectors." Usually, TPOS detectors are not edge detectors. However, some precision rotation detectors can be edge detectors.

Conventional magnetic field sensors, even TPOS detectors, are unable to identify An accurate position (e.g., a rotation angle) of a target object when the target object is not moving.

It would be desirable to provide a magnetic field sensor that can achieve an accurate output signal that can more accurately identify a position of a target object, even when the target object is stationary.

SUMMARY

The present invention provides a magnetic field sensor that can achieve an accurate output signal that can more accurately identify a position of a target object, even when the target object is stationary.

In accordance with an example useful for understanding an aspect of the present invention, a magnetic field sensor for sensing a movement of a target object can include a substrate having a major planar surface. The magnetic field sensor can also include three or more magnetic field sensing elements disposed upon the major planar surface of the substrate, the three or more magnetic field sensing elements having respective major response axes, each major response axis parallel to the major planar surface of the substrate. The three or more magnetic field sensing elements include first and third magnetic field sensing elements and a second magnetic field sensing element disposed between the first and third magnetic field sensing elements. A first spacing between the first and second magnetic field sensing elements is less than a second spacing between the second and third magnetic field sensing elements. There is no other magnetic field sensing element disposed between the first and third magnetic field sensing elements. The three or more magnetic field sensing elements are configured to generate three or more magnetic field signals. The magnetic field sensor can also include an electronic circuit disposed upon the substrate and coupled to the three or more magnetic field sensing elements. The electronic circuit can include at least one analog or digital comparator configured to compare the three or more magnetic field signals to at least one threshold value to generate three or more binary signals, respectively, wherein states of the three or more binary signals are each indicative of a position of the target object relative to the three or more magnetic field sensing elements for any movement speed of the target object including zero movement speed.

In accordance with an example useful for understanding another aspect of the present invention, a method of sensing a movement of a target object can include generating three or more magnetic field signals with three or more magnetic field sensing elements disposed upon a major planar surface of a substrate. The three or more magnetic field sensing elements can have respective major response axes, each major response axis parallel to the major planar surface of the substrate. The three or more magnetic field sensing elements comprise first and third magnetic field sensing elements and a second magnetic field sensing element disposed between the first and third magnetic field sensing elements. A first spacing between the first and second magnetic field sensing elements is less than a second spacing between the second and third magnetic field sensing elements. There is no other magnetic field sensing element disposed between the first and third magnetic field sensing element. The method can also include comparing the three or more magnetic field signals to at least one threshold value to generate three or more binary signals, respectively, States of the three or more binary signals are each indicative of a position of the target object relative to the three or more magnetic field sensing elements for any movement speed of the target object including zero movement speed.

In accordance with an example useful for understanding another aspect of the present invention, a magnetic field sensor for sensing a movement of a target object can include means for generating generate three or more magnetic field signals with three or more magnetic field sensing elements disposed upon a major planar surface of a substrate. The three or more magnetic field sensing elements can have respective major response axes, each major response axis parallel to the major planar surface of the substrate, wherein the three or more magnetic field sensing elements comprise first and third magnetic field sensing elements and a second magnetic field sensing element disposed between the first and third magnetic field sensing elements. A first spacing between the first and second magnetic field sensing elements is less than a second spacing between the second and third magnetic field sensing elements. There is no other magnetic field sensing element disposed between the first and third magnetic field sensing element. The magnetic field sensor can also include means for comparing the three or more magnetic field signals to at least one threshold value to generate three or more binary signals, respectively, wherein states of the three or more binary signals are each indicative of a position of the target object relative to the three or more magnetic field sensing elements for any movement speed of the target object including zero movement speed.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
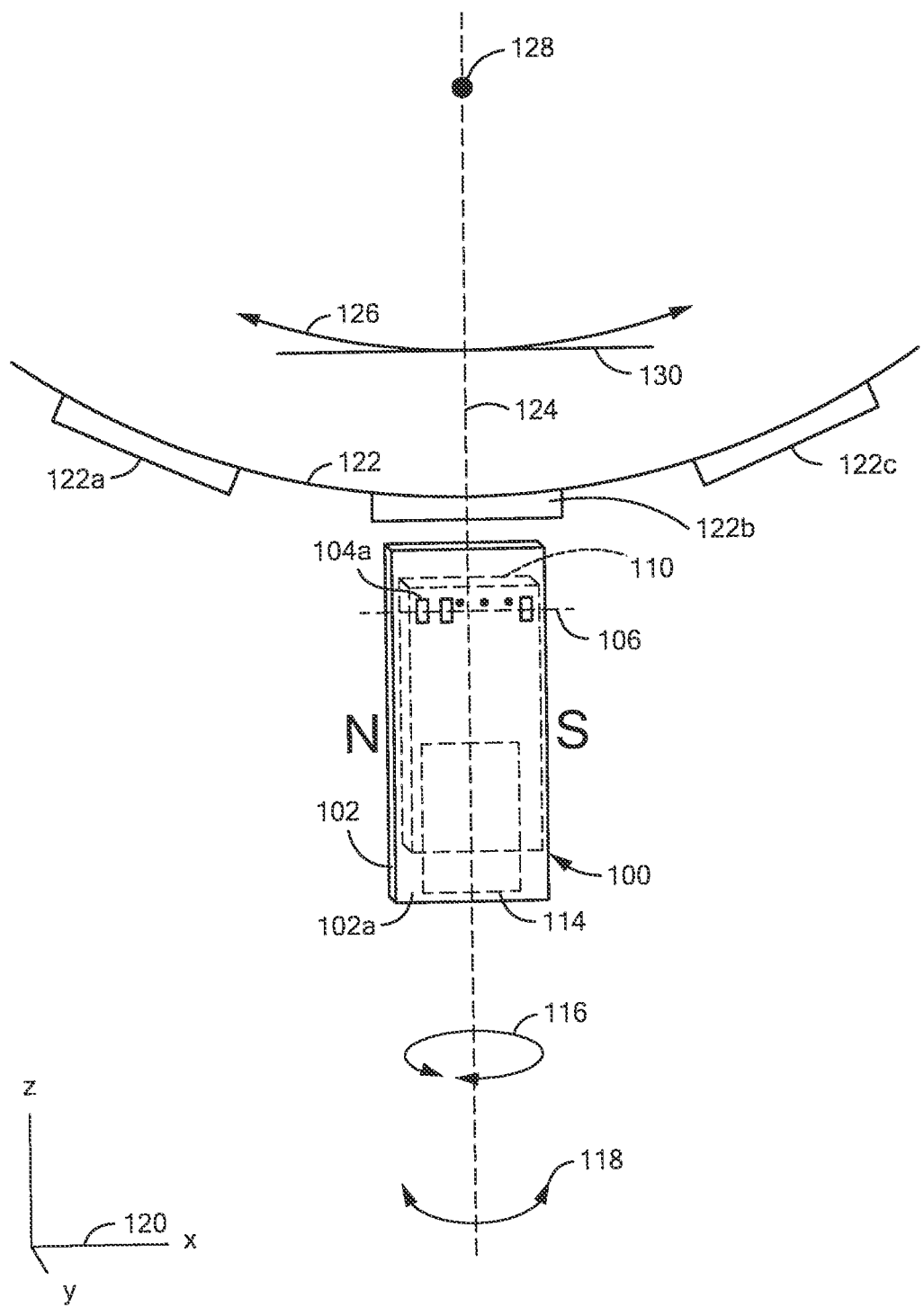
FIG. 1 is a block diagram showing an example of a magnetic field sensor having a three or more magnetic field sensing elements and an electronic circuit both disposed on a substrate, and also having a magnet, wherein the substrate is proximate to a target object in the form of a gear.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/− ten degrees.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be analog or digital.

As used herein, the term "module" can be used to describe a "processor." However, the term "module" is used more generally to describe any circuit that can transform an input signal into an output signal that is different than the input signal.

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of an analog comparator having a two state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "amplifier" is used to describe a circuit element with a gain greater than one, less than one, or equal to one.

As used herein, the terms "line" and "linear" are used to describe either a straight line or a curved line. The line can be described by a function having any order less than infinite.

Giant magnetoresistance (GMR) elements are shown and described in conjunction with figures below. However, in other embodiments, the GMR elements can be replaced by tunneling magnetoresistance (TMR) elements. In still other embodiments, the GMR elements can be replaced by planar or vertical Hall effect elements or other types or magnetic field sensing elements with modifications that will be understood.

Referring to FIG. 1, a magnetic field sensor 100 is responsive to a gear 122 having gear teeth, e.g., gear teeth 122a, 122b, 122c. The magnetic field sensor 100 can include a plurality of, i.e., three or more, magnetic field sensing elements, e.g., 104a, coupled to an electronic circuit 114. In some embodiments, ones of the magnetic field sensing elements, e.g., 104a, are separated in a direction along an axis 106 between outer ones of the three or more magnetic field sensing elements by a distance between about 0.5 millimeters and about 2.5 millimeters. In general, the spacing can be selected to be between about 0.25 and 2.0 times a full cycle of features of the target object (e.g., outer edges of a tooth and a valley or outer edges of north and south poles).

The spacings between magnetic field sensing elements are not equal. Examples of the unequal spacings are described below in conjunction with FIGS. 7-10.

The three or more magnetic field sensing elements, e.g., 104a, and the electronic circuit 114 can be disposed upon a major surface 102a of (i.e., integrated within or upon) a substrate 102.

While three or more magnetic field sensing element to generate three or more magnetic field signals are described herein, there can be three or any integer number greater than three magnetic field sensing elements to generate three or any integer number greater than three magnetic field signals in order to achieve the unequal spacings between magnetic field sensing elements.

The magnetic field sensor 100 can also include a magnet 110. The magnet 110 is configured to generate a magnetic field, which is generally directed along an axis 106 at the position of the three or more magnetic field sensing elements, e.g., 104a, and is generally parallel to the major surface 102a of the substrate 102.

The three or more magnetic field sensing elements, e.g., 104a, have respective maximum response axes parallel to the major surface 102a of the substrate 102. In some embodiments, the maximum response axes are parallel to each other. In some embodiments, the maximum response axes are substantially parallel to the axis 106. In other embodiments, the maximum response axes are substantially perpendicular to the axis 106.

A line perpendicular to the major surface 102a of the substrate (i.e., into the page) intersects the magnet 110 and does not intersect the gear 122. Furthermore, the three or more magnetic field sensing elements, e.g., 104a, are disposed at a position such that the axis (e.g., 106) passing through the three or more magnetic field sensing elements, e.g., 104a, does not intersect the gear 122. In some embodiments, the axis (e.g., 106) passing through the three or more magnetic field sensing elements, e.g., 104a, is substantially parallel to a tangent 130 to a direction of movement, e.g., 126, of the gear 122.

In the embodiment shown, a line between north (N) and south (S) poles of the magnet 110 is substantially parallel to the major surface 102a of the substrate 102, and is substantially parallel to the axis (e.g., 106) passing through the three or more magnetic field sensing elements, e.g., 104a. In some embodiments, the line between north and south poles does not intersect the ferromagnetic target object 122.

The magnetic field sensor 100 can use the three or more magnetic field sensing elements, e.g., 104a, to generate a respective three or more magnetic field signals.

The electronic circuit 114 is configured to generate an output signal (not shown). An example of an electronic circuit is described more fully below in conjunction with FIGS. 3-6. Let is suffice here to say that the electronic circuit 114 is configured to compare each one of the three or more magnetic field signals generated by the three or more magnetic field sensing elements, e.g., 104a, to a respective threshold signal to generate a three or more binary signals. States of the three or more binary signals are indicative of a position of the ferromagnetic target object 122, and, in particular, a position of an edge of a gear tooth or an edge of a gear valley, relative to the three or more magnetic field sensing elements. It will be apparent that the magnetic field sensor 100 can operate as an edge detector, a tooth detector, or both.

An output signal, when the gear 122 is rotating, can be indicative of the position of the target object 122 and may also be indicative of speed of rotation of the target object 122 and may also be indicative of a direction of rotation of the target object 122. The magnetic field sensor 100 is able to provide a TPOS function, and, when the gear 122 is stationary, is able to identify whether individual ones of the three or more magnetic field sensing elements, e.g., 104a, are proximate to a gear tooth or a valley in the gear 122.

The magnetic field sensor 100 can be able to identify a direction of rotation of the target object 122 by way of a detected progression of magnetic field changes sensed by the three or more magnetic field sensing elements, e.g., 104a as the target object 122 moves (i.e. rotates.).

The magnet 110 can be comprised of one uniform material, and can have no central core. In some embodiments, the magnet 110 can be rectangular.

Each respective one of the three or more magnetic field signals is responsive to a magnetic field generated by the magnet 110 and influenced by a position of features of a ferromagnetic target object, e.g., gear teeth 122a, 122b, 122c, relative to a position of each respective one of the three or more magnetic field sensing elements. The ferromagnetic target object 122 is configured to move in two directions 126 of movement about an axis of rotation 128. The three or more magnetic field sensing elements, e.g., 104a, are disposed along the axis 106, which is substantially parallel to the tangent 130.

In some alternate embodiments, the three or more magnetic field sensing elements, e.g., 104as, are disposed along an arc rather than along the line 106. A diameter of the arc can be the same as or similar to a diameter of the gear 122. The arc can be curved in the same direction as the circumference of the gear, or in the other direction. When disposed in an arc, maximum response axes of the magnetic field sensing elements can be parallel to each other, or they may not be parallel to each other. An arc arrangement is shown below in conjunction with FIG. 15.

In some embodiments, the three or more magnetic field sensing elements, e.g., 104a, have a respective three or more maximum response axes parallel to each other. In some embodiments, the maximum response axes are substantially parallel to the axis 106. In other embodiments, the maximum response axes are substantially perpendicular to the axis 106.

The magnetic field sensor 100 can be rotated in a direction 116 to a next position one hundred eighty degrees apart from the position shown, with no degradation of performance. However, intermediate rotations may result in a degradation of performance.

The magnetic field sensor 100 can be rotated in a direction of and arrow 118 with a center of rotation anywhere along a line 124, through approximately +/− twenty degrees, without substantial degradation of performance.

In some embodiments, the three or more magnetic field sensing elements, e.g., 104a, are magnetoresistance elements. In other embodiments, the three or more magnetic field sensing elements are Hall effect elements, e.g., vertical Hall effect elements. However, it is advantageous to use magnetic field sensing elements for which respective axes of maximum sensitivity are parallel to the axis 106.

Figure 2:
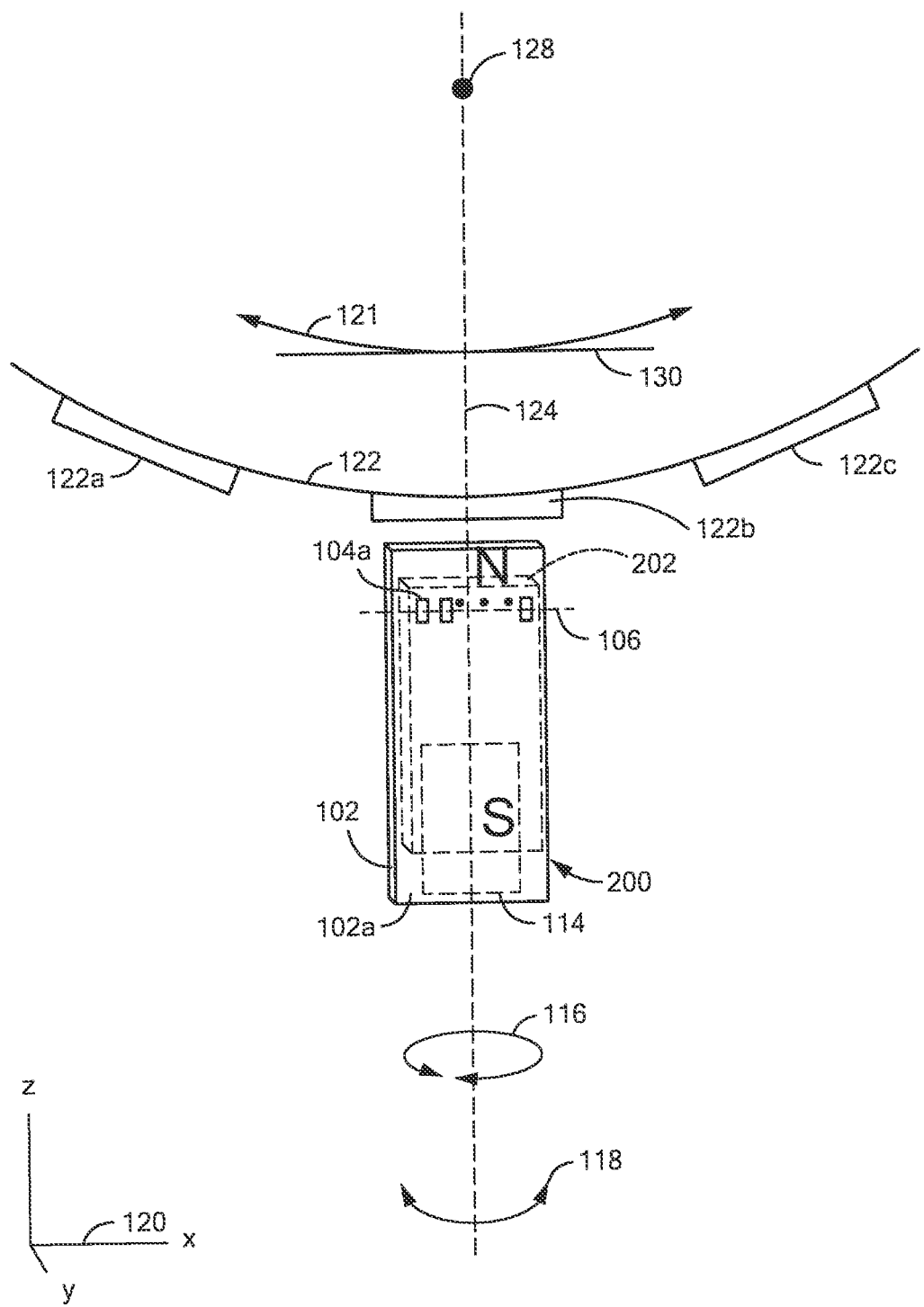
FIG. 2 is a block diagram showing an example of another magnetic field sensor having a three or more magnetic field sensing elements and an electronic circuit both disposed on a substrate, and having a magnet different than the magnet of FIG. 3, wherein the substrate is proximate to a target object in the form of a gear.

Referring now to FIG. 2, in which like elements of FIG. 1 are shown having like reference designations, a magnetic field sensor 200 is like the magnetic field sensor 100 of FIG. 1. However, the magnetic field sensor 200 has a different magnet 202 for which a line between north (N) and south (S) poles of the magnet 202 is substantially parallel to the major surface 102a of the substrate 102, and substantially perpendicular to the axis (e.g., 106) passing through the three or more magnetic field sensing elements, e.g., 104a. In some embodiments, the line between the north and south poles of the magnet 102 is in a direction toward the gear 122, parallel to the axis 124, and intersects the gear 122.

Figure 3:
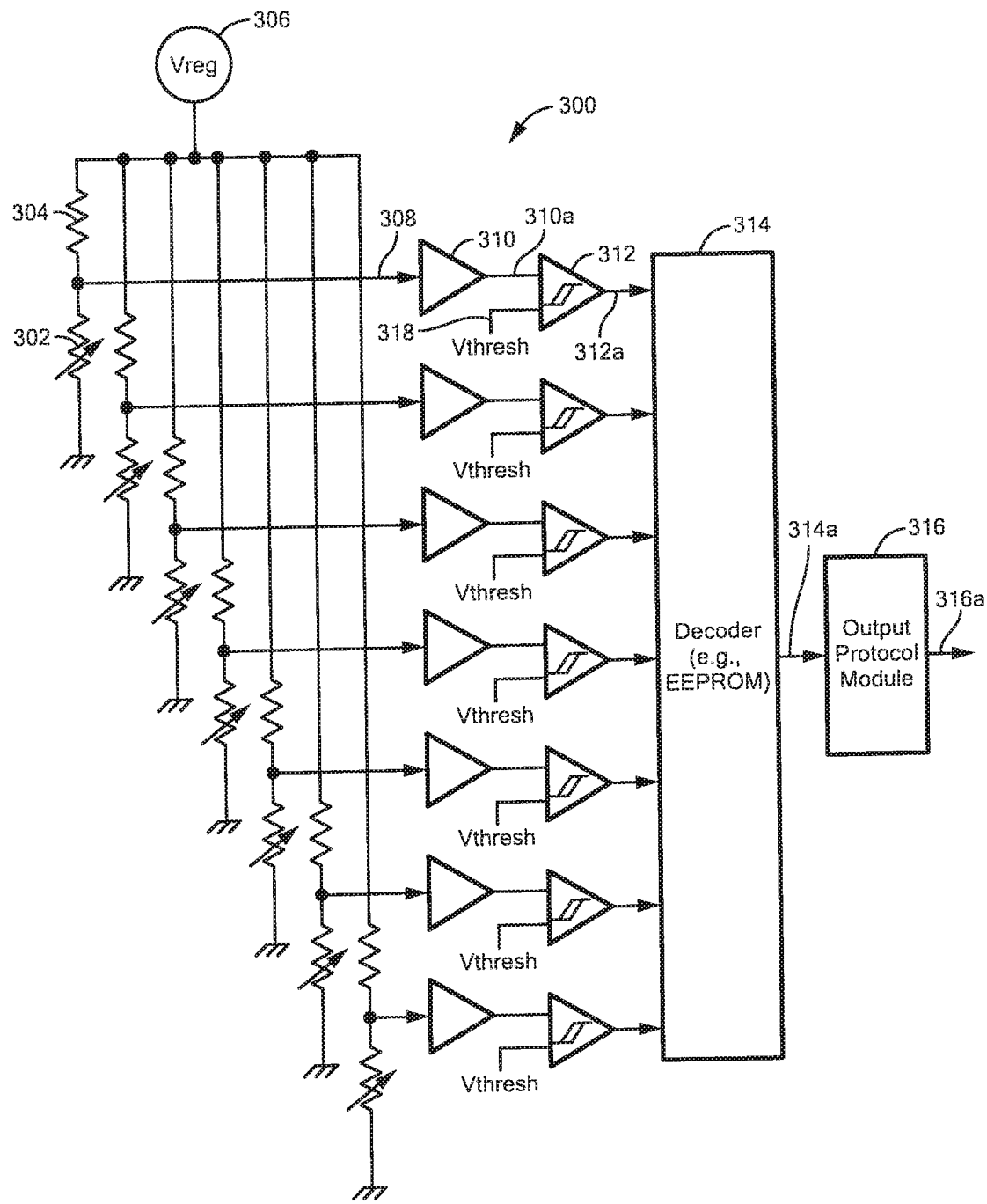
FIG. 3 is a block diagram showing an illustrative three or more magnetic field sensing elements and an illustrative electronic circuit that can be used as the three or more magnetic field sensing elements and the electronic circuit of FIGS. 1 and 2 and others.

Referring now to FIG. 3, an electronic circuit 300 can be the same as or similar to electronic circuit 114 of FIGS. 1 and 2 and can be coupled to three or more magnetoresistance elements, e.g., 302, which can be the same as or similar to the three or more magnetic field sensing elements, e.g., 104a, of FIGS. 1 and 2.

The electronic circuit 300 can include a three or more electronic channels, of which a channel having a magnetoresistance element 302 and a fixed resistor 304 is but one example. The three or more electronic channels can be coupled to receive a voltage from a voltage generating source 306. Taking the magnetoresistance element 302 and the fixed resistor 304, which form a voltage divider, as being representative of elements of other ones of the electronic channels, a voltage signal 308 (also referred to as a parallel signal in view of the parallel channels) can be generated at the junction between the magnetoresistance element 302 and a fixed resistor 304. The voltage signal 308 has a value representative of a magnitude of the magnetic field experienced by the magnetoresistance element 302. Other ones of the electronic channels generate voltage signals having values representative of magnetic fields experienced by other ones of the magnetoresistance elements.

In some embodiments, a quantity of the magnetoresistance elements can be in the range of three to twenty.

In other embodiments, the voltage generating source 306 can be replaced with a current generating source or with separate current generating sources to drive each resistor divider, e.g., 302, 304. In some embodiments, the separate current generating sources can be separate controlled legs of current mirrors, each having the same reference leg.

The voltage signal 308 can be received by an amplifier 310. The amplifier 310 can be configured to generate an amplified signal 310a. A comparator 312 can be coupled to receive the amplified signal 310a, coupled to receive a threshold signal 318, and configured to generate a comparison signal 312a (i.e., a binary, two-state, signal).

In some other embodiments, the amplifiers, e.g., 310, are not used.

A decoder 314, for example, a nonvolatile memory device, for example, an electrically erasable read only memory (EEPROM), can be coupled to receive three or more such comparison signals at a multi-bit parallel signal. The decoder 314 can produce a decoded signal 314a, which can be a single bit (e.g., serial) output signal or a multi-bit (e.g., parallel) output signal. The decoded signal 314a can have a value, i.e., a digital value, representative of a position of a gear tooth relative to the three or more magnetoresistance elements, for example, a position of the gear tooth 122b of FIG. 1 relative to a position of the three or more magnetic field sensing elements shown in FIG. 1. Thus, states of the signal 314a are representative of a gear tooth, e.g., 122b, being proximate to one or more of the three or more magnetic field sensing elements and others of the three or more magnetic field sensing elements being proximate to a valley of the gear 122.

It will be appreciated that the decoder 314 can act as a look-up table, and can provide any desired mapping of the binary signal, e.g., 312a, to output signal 314a. The same electronic circuit can be applied to both the magnetic field sensor 100 of FIG. 1 and to the magnetic field sensor 200 of FIG. 2, but perhaps with different look up tables stored in the decoder 314.

In other embodiments, the decoder 314 can be a processor, a module, or a plurality of interconnected gates.

The decoded signal 314a can be indicative of a position of the target object 122, and, can also be indicative of a speed of rotation and/or a direction of rotation of the ferromagnetic target object, e.g., 122 of FIG. 1.

In some embodiments, the decoded signal 314a is coupled to an output protocol module 316. The output protocol module 316 is configured to generate a formatted signal 316a in a selected one of a plurality of formats including, but not limited to, a SENT format, an I2C format, a PWM format, or a binary format.

The formatted signal 316a is indicative of the position of the target object 122, whether moving or not moving, and thus, can also be indicative of a speed of rotation and/or a direction of rotation of the ferromagnetic target object, e.g., 122 of FIG. 1. To this end, the output protocol module 316 can use the decoded signal 314a to identify the speed of rotation and/or the direction of rotation of the ferromagnetic target object.

Certain digital values of the signal 314a may be indicative of a center (or an edge) of a target feature (e.g., gear tooth) being proximate to particular ones of the three or more magnetoresistance elements, and certain other digital values of the signal 314a may be indicative of the center (or the edge) of the target feature being proximate to other particular ones of the three or more magnetoresistance elements.

While the electronic circuit 300 is shown to have a plurality of simple voltage dividers, e.g., a voltage divider formed from the magnetoresistance element 302 with the fixed resistor 304, in other embodiments, each channel can use a different arrangement, for example, a Wheatstone (full) bridge having two or more magnetoresistance elements.

In still other embodiments, each one of the electronic channels can use a respective Hall effect element, e.g., a respective vertical Hall effect element. As is known, a Hall element can receive, i.e., can be driven by, either a voltage source or a current source, and the Hall effect element can generate, from two output signal nodes, a differential output signal. It should be apparent how the electronic circuit 300 can be modified to use Hall effect elements instead of magnetoresistance elements.

While a plurality of comparators (e.g., 312) is shown, in other embodiments, there can be one or more comparators that are time multiplexed to provide a serial digital channel. Similarly, while a three or more amplifiers 310 is shown, in other embodiments, one or more amplifiers can be time multiplexed to provide the serial channel. A multiplexed arrangement is described below in conjunction with FIGS. 4 and 5.

Figure 4:
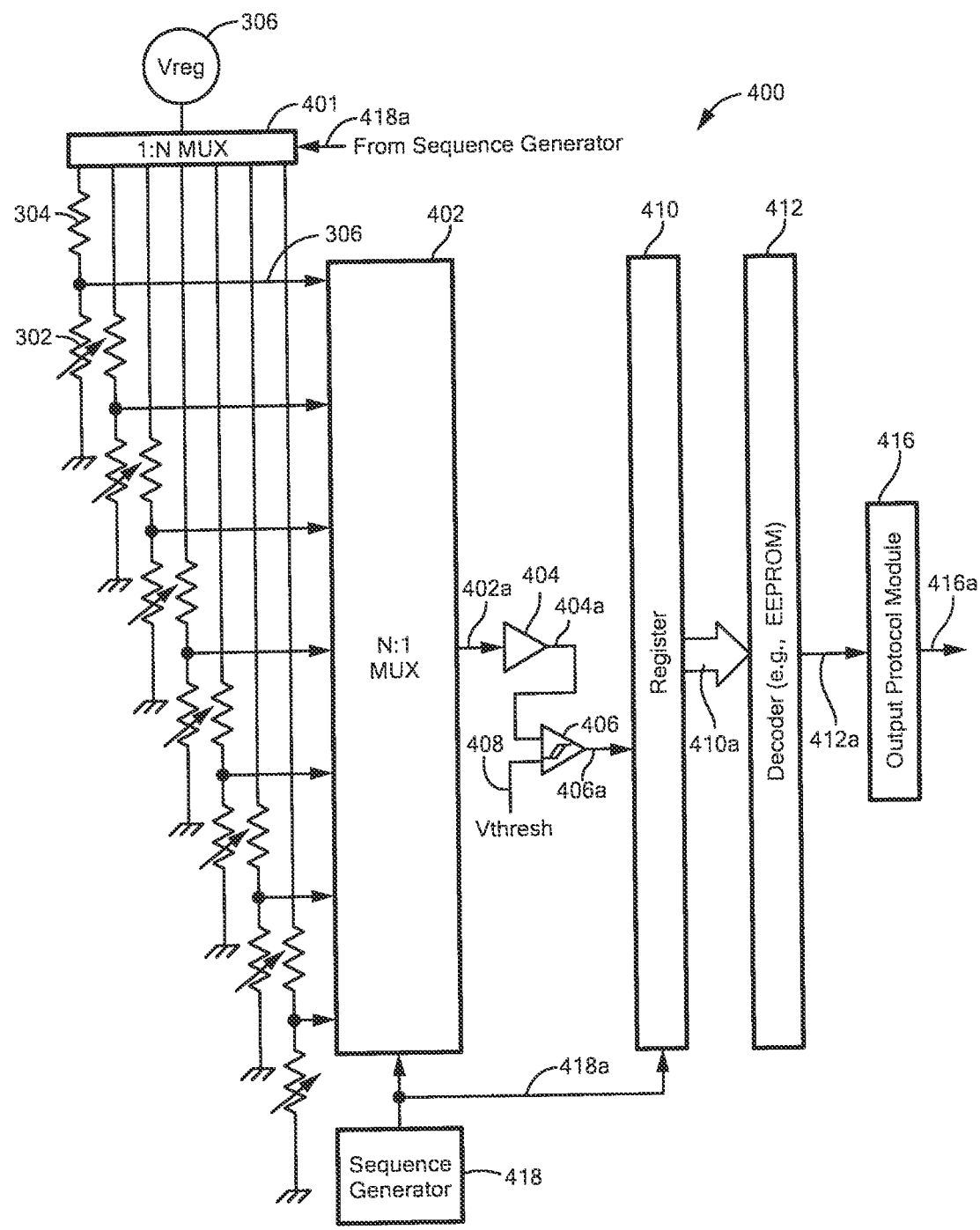
FIG. 4 is a block diagram showing an illustrative three or more magnetic field sensing elements and another illustrative electronic circuit that can be used as the three or more magnetic field sensing elements and the electronic circuit of FIGS. 1 and 2 and others.

Referring now to FIG. 4, in which like elements of FIG. 3 are shown having like reference designations, the parallel signal channels, e.g., 306, can be coupled to an N:1 multiplexer 402 to generate a serial signal 402a, comprised to sequential ones of the parallel signal channels, e.g., 308. Accordingly, a 1:N multiplexer 401 can power the three or more magnetoresistance elements sequentially, one or more at a time.

An amplifier 404 can be coupled to the serial signal 402a and can generate a serial amplified signal 404a.

A comparator 408 can be coupled to the amplified serial signal 404a, can receive a threshold signal 408, and can generate a serial comparison signal 312a (i.e., a series of binary, two-state, values).

Digital registers 410 can be coupled to the serial comparison signal 406a and can compose a parallel comparison signal 410a similar to that which is generated by the comparators, e.g., 312 of FIG. 3.

A decoder 412 can be the same as or similar to the decoder 314 of FIG. 3. An output format module 416 can be the same as or similar to the output format module 316 of FIG. 3.

A sequence generator 418 can generate a sequence signal 416a to control the sequencing to the N:1 multiplexer 402 and the registers 410 and also to control a sequencing of the 1:N multiplexer 401. The 1:N multiplexer 401 can provide power to one or more of the magnetoresistance elements, e.g., 302, at a time. This arrangement can reduce operational power consumption.

Figure 5:
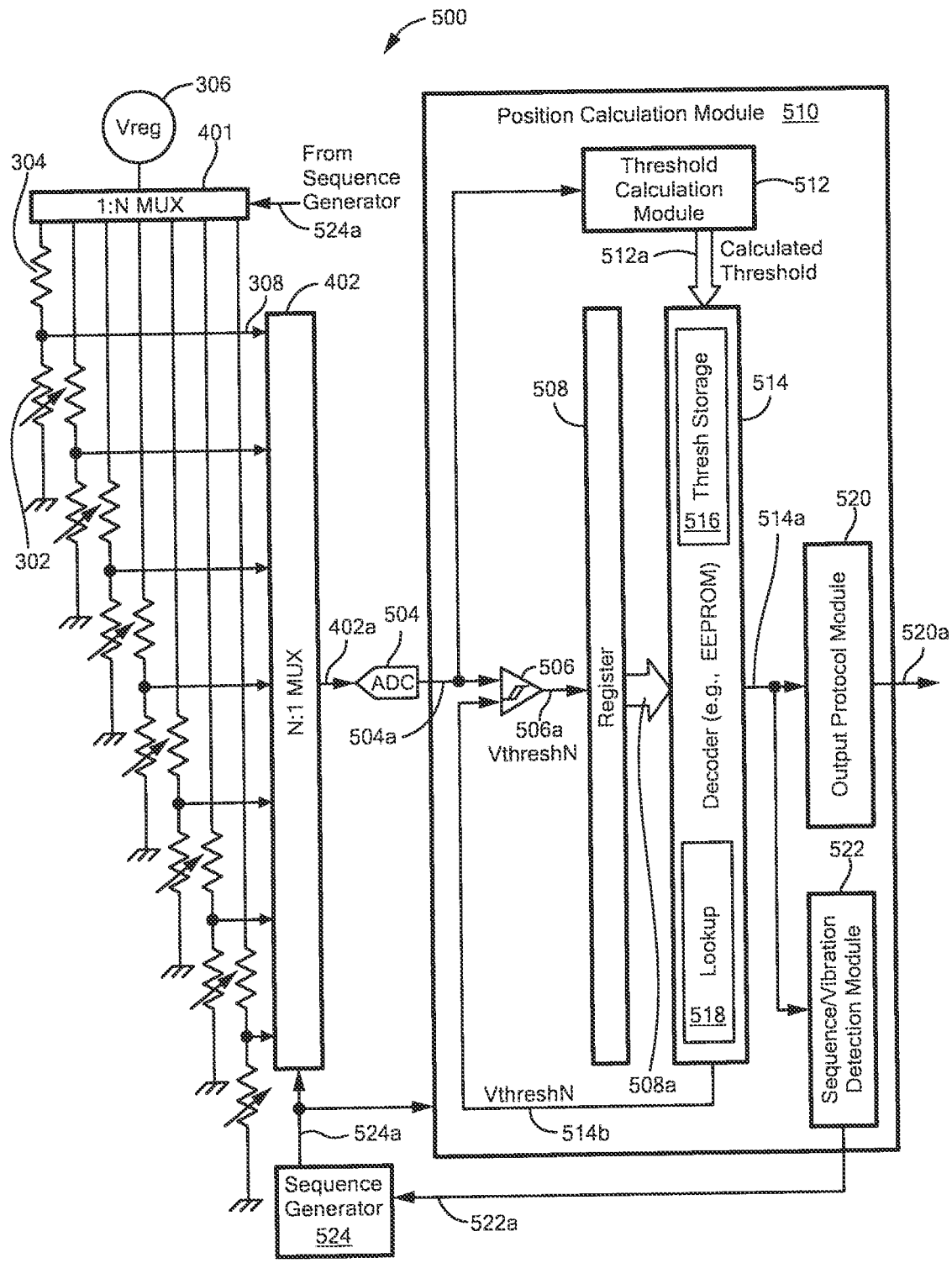
FIG. 5 is a block diagram showing an illustrative three or more magnetic field sensing elements and another illustrative electronic circuit that can be used as the three or more magnetic field sensing elements and the electronic circuit of FIGS. 1 and 2 and others, the electronic circuit having a threshold calculation module.

Referring now to FIG. 5, in which like elements of FIGS. 3 and 4 are shown having like reference designations, an electronic circuit 500 can be the same as or similar to electronic circuit 114 of FIGS. 1 and 2, coupled to a three or more magnetoresistance elements, which can be the same as or similar to the three or more magnetic field sensing elements, e.g., 104a, of FIGS. 1 and 2.

The electronic circuit 500 can include a three or more electronic channels, of which a channel having the magnetoresistance element 302 and a fixed resistor 304 is but one example.

An analog-to-digital converter (ADC) 512 can be coupled to receive the serial signal 402a and can generate a converted signal 502a, which can be comprised of sequential parallel sets of digital bits indicative of amplitudes of signals generated by the three or more magnetoresistance elements, e.g., 302.

A position calculation module 504 (e.g., a processor) can be coupled to receive the converted signal 504a. In particular, a digital comparator 506 within the position calculation module 504 can be coupled to receive the converted signal 502a. The digital comparator 506 can also be coupled to receive one or more digital threshold values 514b and can be configured to generate a comparison signal 506a. In some embodiments, the comparison signal 506a can be a sequential set of single bit binary values.

Registers 508 can be coupled to the comparison signal and can assemble the bits into a parallel comparison signal 508a, similar to the parallel comparison signal 410a of FIG. 4.

A decoder 514, e.g., a nonvolatile memory device, for example, an EEPROM, can be coupled to receive the parallel comparison signal 508a. The decoder 514 can include a lookup table 518 to receive the parallel comparison signal 508a and can generate a decoded signal 518a, which can be a single bit signal or a multi-bit signal. The decoded signal 514a can be similar to the decoded signal 412a of FIG. 4.

The decoded signal 514a can be indicative of a position, a speed of rotation, and/or a direction of rotation of the ferromagnetic target object, e.g., 122 of FIG. 1.

An output protocol module 520 can receive the decoded signal 514a and can generate a formatted signal 520a, which can be the same as or similar to the formatted signal 416a of FIG. 4.

The formatted signal 514a can be indicative of a position, speed of rotation, and/or a direction of rotation of the ferromagnetic target object, e.g., 122 of FIG. 1. To this end, the output protocol module 510 can use the signal 508a to identify the speed of rotation and/or the direction of rotation of the ferromagnetic target object.

In some embodiments, the position calculation module 510 can also include a threshold calculation module 512 coupled to receive the serial converted signal 504a, described more fully below in conjunction with FIG. 6.

Let it suffice here to say that, in operation, the threshold calculation module 512 can identify desired threshold values, e.g., 514b, to use as inputs to the digital comparator, e.g., 506. For example, in some embodiments, the threshold calculation module 514 can calculate positive and negative peak values of the converted signal 504a associated with ones of the voltage signals, e.g., 308, can compute peak-to-peak values, and can compute respective threshold values to be desired percentages of the peak-to peak values. For example, in some embodiments, calculated thresholds can switch between approximately sixty percent and approximately forty percent of the peak-to-peak values the voltage signals, e.g., 308. Accordingly, the position calculation module 510 can store in a threshold storage region 516 of the decoder 514, the calculated threshold values, and can supply the calculated threshold values from the threshold storage area 516 to the digital comparator, e.g., 506.

With the above arrangement, after a power down to the electronic circuit 500, upon powering up again, the stored threshold values can be rapidly used, resulting in a faster power up response time.

In some embodiments, the position calculation module 510 can also include a sequence/vibration detection module 522 coupled to the decoded signal 514a. The sequence/vibration detection module 522 can be operable to detect a proper sequence of the features (e.g., gear teeth) of the target object moving past the three or more magnetoresistance elements, e.g., 302 of FIGS. 4 and 5, in sequence. If an improper sequence is detected, then a vibration of the target object 122 of FIGS. 1 and 2 may be suspected. If a vibration is detected, the sequence/vibration detection module 522 can send a sequence control signal 522a to sequence generator 524, which can alter sequence signal 524a to change the sequence used by the N:1 multiplexer 502. The altered sequence can essentially repeat selection of one or more of the three of more magnetoresistance elements, e.g., 302, providing a recheck of the improper sequence previously detected. Furthermore, if a vibration is detected, the sequence/vibration detection module 522 can generate a vibration detection signal 522b that can alter the formatted signal 520a.

In some embodiments, the sequence/vibration detection module 522 is also operable to detect a rate of movement of the target object, e.g., 122 of FIGS. 1 and 2, by way of the decoded signal 514a. If the target object moves slowly, then the sequence generator 524 can alter the sequence control signal 524a to slow down the rate at which the N:1 multiplexer and other elements sample the signals generated by the three or more magnetoresistance elements. In some embodiments, the sampling rate is proportional to the rate of movement of the target object. In other embodiments, the sequence generator 524 can provide discrete sampling rates, for example, two sampling rates, e.g., fast and slow, in accordance with a rate threshold of the rate of movement of the target object.

While the threshold storage module 516 is shown to be within the position calculation module 510, in other embodiments, the threshold storage module 516 is outside of the position calculation module 510.

Some other embodiments are a combination of parts of FIGS. 3, 4, and 5.

Figure 6:
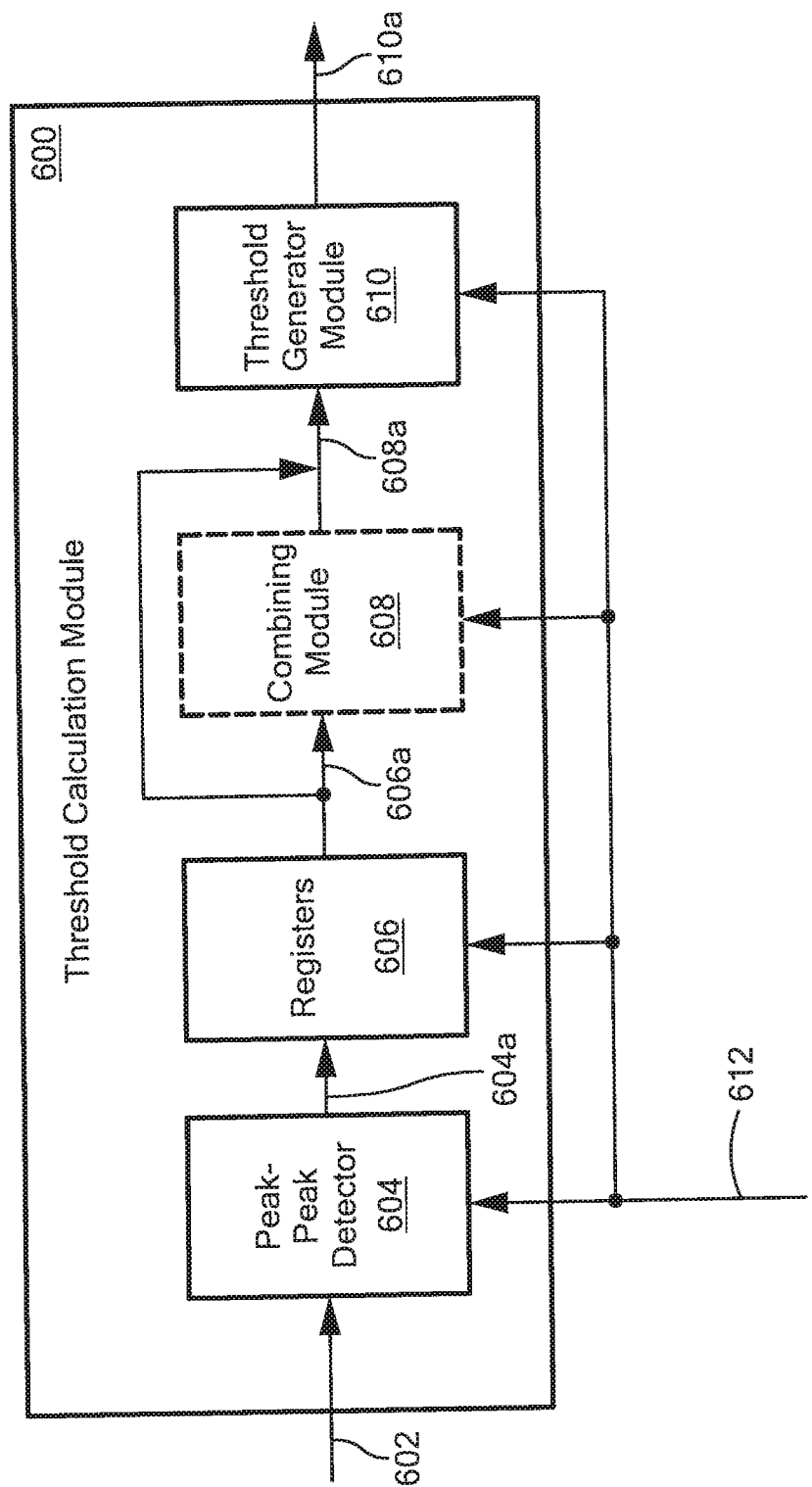
FIG. 6 is a block diagram showing an illustrative threshold calculation module that can be used as the threshold calculation module of FIG. 5.

Referring now to FIG. 6, a threshold calculation module 600 can be the same as or similar to the threshold calculation module 512 of FIG. 5.

The threshold calculation module 600 can include a peak-to-peak detector 604 to identify one or more peak-to-peak values of a respective one or more of the time multiplexed signals carried in a converted signal 602, which can be similar to the converted signal 504a of FIG. 5.

Peak-to-peak values 604a associated with each one of the three or more magnetoresistance elements, e.g., 302, can be temporarily stored in registers 606.

Optionally, the stored peak-to-peak values 606a can be combined, for example, averaged to generate and average peak-to-peak value 608a, to generate a combined peak-to-peak value 608a A threshold generator module 610 can convert the combined peak-to-peak value 608a to generate a threshold value 610a. For example, in some embodiments, the threshold value 610a can be a predetermined percentage of the combined peak-to-peak value 608a, for example, forty percent, fifty percent, or sixty percent of the combined peak-to-peak value 608a. It should be apparent that this arrangement provides the same threshold value 610a for all magnetoresistance elements, e.g., 302, that are used in the combining of the combining module 608.

In other arrangements, the combining module 608 is not provided, and instead, the peak to peak values 606a associated with the magnetoresistance elements separately can be provided to the threshold generator module 610. In this arrangement, the threshold generator module 610 can generate separate threshold values associated with the three or more magnetoresistance elements, e.g., 302 of FIGS. 3-5. The separate threshold values can be provided sequentially in the threshold signal 514b of FIG. 5.

Figure 7:
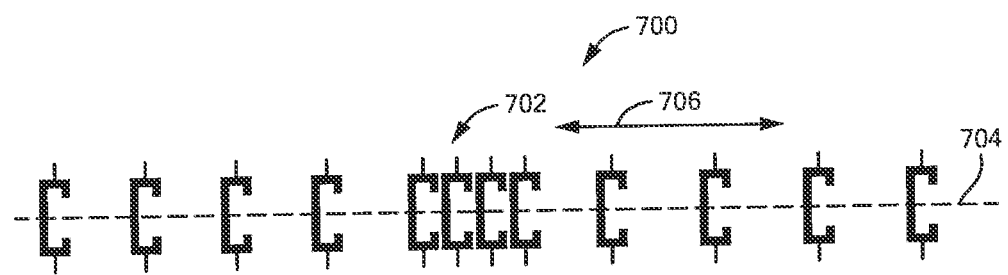
FIGS. 7-10 show illustrations of examples of three or more magnetic field sensing elements, here magnetoresistance elements, having unequal spacings that can be used as the three or more magnetic field sensing elements of FIGS. 1-5 and others.

Referring now to FIG. 7, three or more magnetoresistance elements 700, here twelve magnetoresistance elements, can be arranged with unequal spacing along a line 704, such that a group 702 of the magnetoresistance elements 700 is more closely spaced than other ones of the magnetoresistance elements 700. Features, e.g., gear teeth, of a target object can be stationary with respect to the three or more magnetoresistance elements 700, or can otherwise move and pass by the three or more magnetoresistance elements 700 in one or more directions indicated by an arrow 706.

It will be apparent that magnetoresistance elements more closely spaced provide a higher resolution of accuracy of the position of the feature (e.g., gear tooth) relative to the three or more magnetoresistance elements 700 if the feature is proximate to the more closely spaced magnetoresistance elements 702 or as the feature passes by the more closely spaced magnetoresistance elements 702.

The higher resolution of position accuracy may be important in some applications. For example, in an automobile application, it may be important to have a higher resolution of position at a movement position of the target object that is associated with an action of the automobile, for example, a precise rotation angle of a cam shaft when the engine should fire spark plugs.

Figure 8:
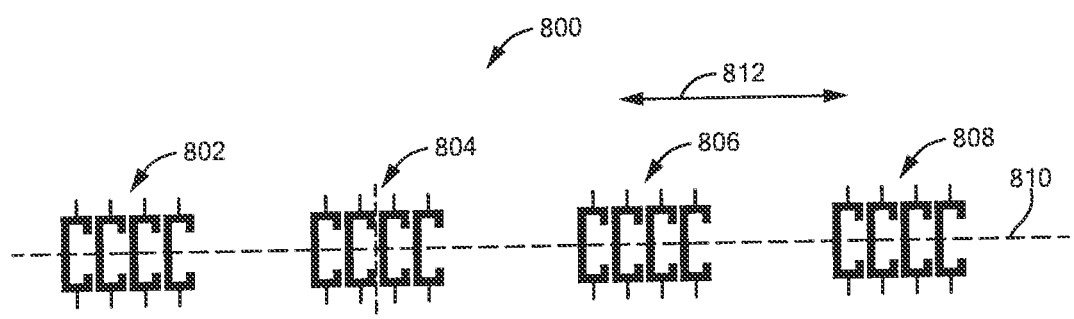

Referring now to FIG. 8, three or more magnetoresistance elements 800, here sixteen magnetoresistance elements, can be arranged with unequal spacing along a line 810, such that groups 802, 804, 806, 808 of the magnetoresistance elements 800 are more closely spaced than other ones of the magnetoresistance elements 800. Features, e.g., gear teeth, of a target object can be stationary with respect to the three or more magnetoresistance elements 800, or can otherwise move and pass by the three or more magnetoresistance elements 800 in one or more directions indicated by an arrow 812.

It will be apparent that magnetoresistance elements more closely spaced provide a higher resolution of accuracy of the position of the feature (e.g., gear tooth) relative to the three or more magnetoresistance elements 800 if the feature is proximate to the more closely spaced magnetoresistance elements 802, 804, 806, 808 or as the feature passes by the more closely spaced magnetoresistance elements 802, 804, 806, 808.

Figure 9:
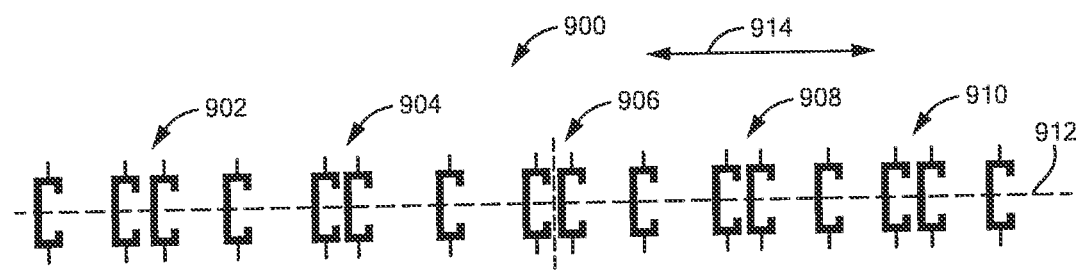

Referring now to FIG. 9, three or more magnetoresistance elements 900, here sixteen magnetoresistance elements, can be arranged with unequal spacing along a line 910, such that groups 902, 904, 906, 908, 910 of the magnetoresistance elements 900 are more closely spaced than other ones of the magnetoresistance elements 900. Features, e.g., gear teeth, of a target object can be stationary with respect to the three or more magnetoresistance elements 900, or can otherwise move and pass by the three or more magnetoresistance elements 900 in one or more directions indicated by an arrow 914.

It will be apparent that magnetoresistance elements more closely spaced provide a higher resolution of accuracy of the position of the feature (e.g., gear tooth) relative to the three or more magnetoresistance elements 900 if the feature is proximate to the more closely spaced magnetoresistance elements 902, 904, 906, 908, 910 or as the feature passes by the more closely spaced magnetoresistance elements 902, 904, 906, 908, 910.

Figure 10:
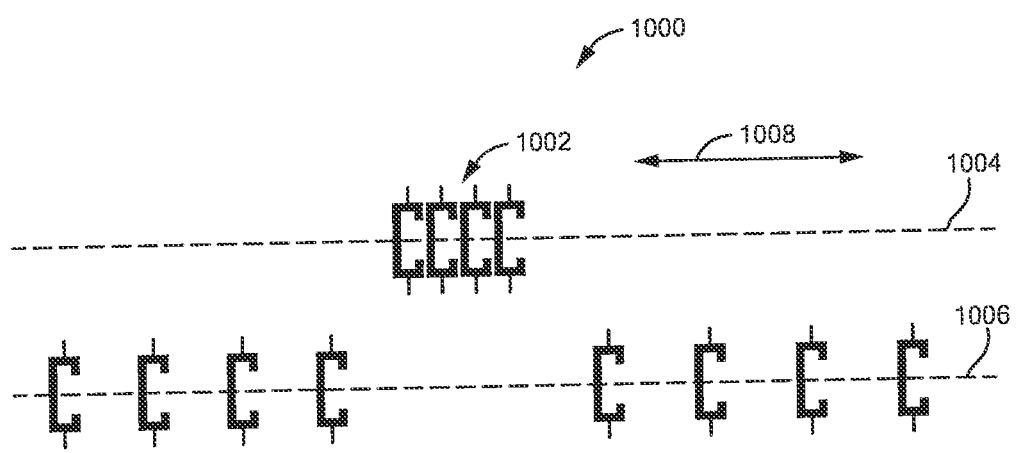

Referring now to FIG. 10, three or more magnetoresistance elements 1000, here twelve magnetoresistance elements, can be arranged with unequal spacing along two lines 1004, 1006, such that a group 1002 of the magnetoresistance elements 1000 is more closely spaced than other ones of the magnetoresistance elements 1000. Features, e.g., gear teeth, of a target object can be stationary with respect to the three or more magnetoresistance elements 1000, or can otherwise move and pass by the three or more magnetoresistance elements 1000 in one or more directions indicated by an arrow 1008.

It will be apparent that magnetoresistance elements more closely spaced provide a higher resolution of accuracy of the position of the feature (e.g., gear tooth) relative to the three or more magnetoresistance elements 1000 if the feature is proximate to the more closely spaced magnetoresistance elements 1002 or as the feature passes by the more closely spaced magnetoresistance elements 1002.

It may be desirable to have the three or more magnetoresistance elements 1000 disposed along two or more line as shown. For example, the more closely spaced group 1002 may otherwise be close to some other magnetic field radiating structure, for example, a power trace upon a semiconductor substrate that holds the three or more magnetoresistance elements 1000. it this case, it may be desirable to move the more closely space group 1002 away from the power trace. There may be other reasons to have the three or more magnetoresistance elements 1000 arranged along two ore more lines.

Figure 11:
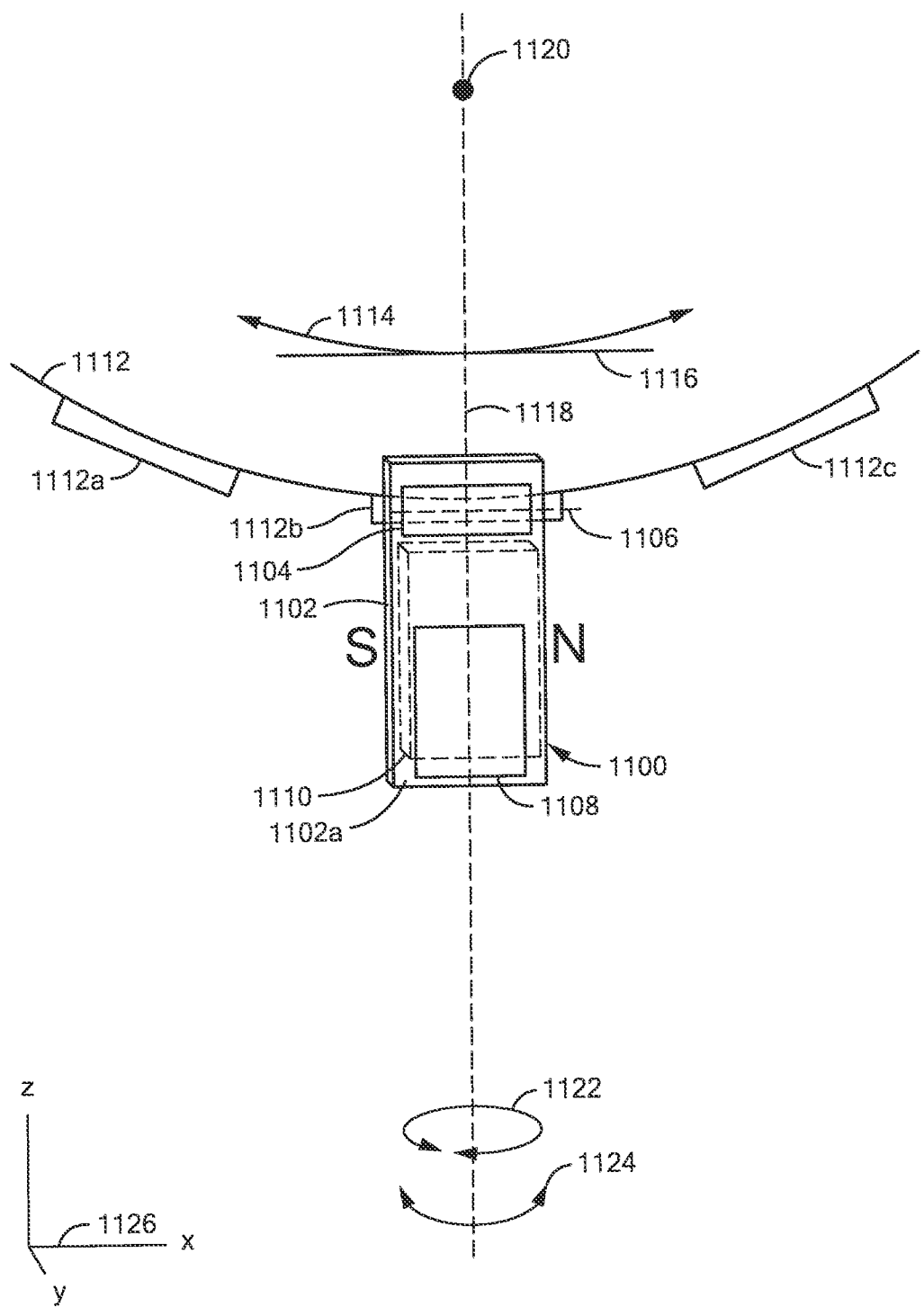
FIG. 11 is a block diagram showing an example of a magnetic field sensor having a three or more magnetic field sensing elements and an electronic circuit both disposed on a substrate, and also having a magnet, wherein the substrate overlaps a target object in the form of a gear.

Referring now to FIG. 11, a magnetic field sensor 1100 can be the same as or similar to the magnetic field sensors 100, 200 of FIGS. 1 and 2. A block 1104 is representative of the three or more magnetic field sensing elements 104a of FIGS. 1 and 2. A block 1108 is representative of the electronic circuit 114 of FIGS. 1 and 2.

The block 1104 representative of the three or more magnetic field sensing elements 104a elements is disposed on a surface 1102a of a substrate 1102. The magnetic field sensor 1100 can include a magnet 1110 disposed as shown behind the substrate 1102 such that a line perpendicular to the substrate 1102 intersects the magnet 1110. North and south poles of the magnet 1110 can be arranged as shown.

Unlike the magnetic field sensors shown above, here the substrate 1102 and the block 1104 representative of the three or more magnetic field sensing elements overlap a target object 1112. The ferromagnetic target object 1112 is shown here to be a ferromagnetic gear having gear teeth, e.g., 1112a, 1112b, 1112c. In another embodiment the magnet 1110 and target object 1112 can be replaced by a ring magnet or permanent magnet (hard ferromagnetic material) as described below in conjunction with FIGS. 13 and 14

The magnetic field sensor 1100 can be rotated in a direction 1122 to a next position one hundred eighty degrees apart from the position shown, with no degradation of performance. However, intermediate rotations may result in a degradation of performance or may not be possible due to contact with the ferromagnetic target object 1112.

The magnetic field sensor 1100 can be rotated in a direction of and arrow 1124 with a center of rotation anywhere along a line 1118, through approximately +/− twenty degrees, without substantial degradation of performance.

Figure 12:
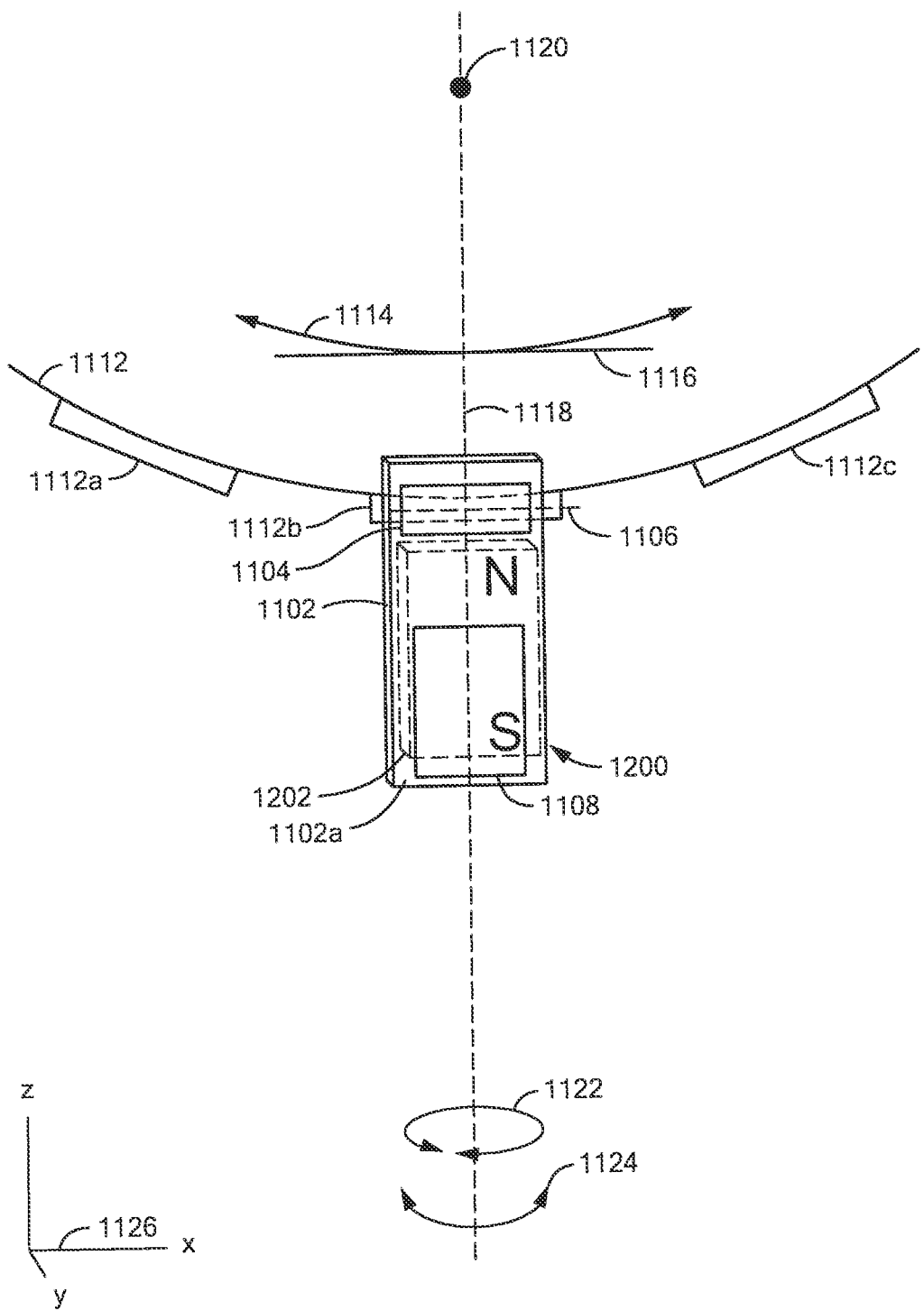
FIG. 12 is a block diagram showing an example of another magnetic field sensor having a three or more magnetic field sensing elements and an electronic circuit both disposed on a substrate, and also having a magnet different than the magnet of FIG. 11, wherein the substrate overlaps a target object in the form of a gear.

Referring now to FIG. 12, in which like elements of FIG. 11 are shown having like reference designations, a magnetic field sensor 1200 is like the magnetic field sensor 1100 of FIG. 11. However, unlike the magnetic field sensor 1100 of FIG. 11, the magnetic field sensor 1200 includes a magnet 1202 having north and south poles arranged as shown, perpendicular to the north and south pole arrangement of the magnet 1110 of FIG. 11.

Magnetic field sensors shown and described above are shown to sense a movement of ferromagnetic target object in the form of a gear or cam. However, FIGS. 13 and 14 described below show similar magnetic field sensors for sensing movement of a ring magnet. Comments made above about edge detectors, tooth detectors, and TPOS functions apply in the same way when sensing a ring magnet.

Figure 13:
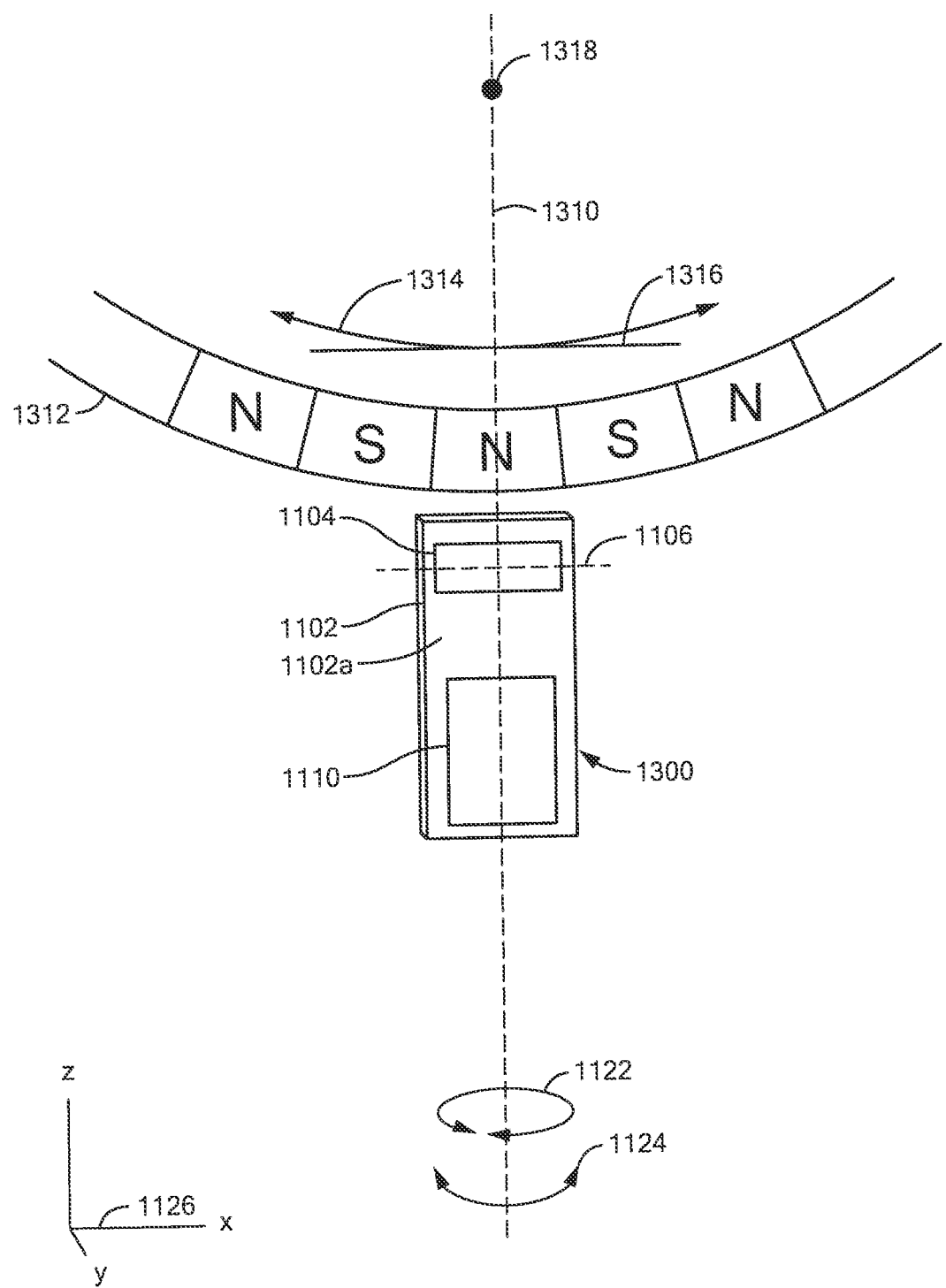
FIG. 13 is a block diagram showing an example of a magnetic field sensor having a three or more magnetic field sensing elements and an electronic circuit both disposed on a substrate, wherein the substrate is proximate to a target object in the form of a ring magnet.

Referring now to FIG. 13, in which like elements of FIG. 11 are shown having like reference designations, a magnetic field sensor 1300 is like the magnetic field sensors described above. However, the magnetic field sensor 1300 has no internal magnet. Instead, the magnetic field sensor 1300 is responsive to passing magnetic domains (features) of a ring magnet 1312. N and S designations shown can be indicative of north and south poles associated with the ring magnet target. A S or N pole would exist on the other side of the page if magnetized perpendicular to the page. In other embodiments the N and S would be on the outer radial dimension toward the ring magnet while a complimentary S or N would exist on the inner radial side of the ring magnet.

In some embodiments, the magnetic domains of the ring magnet 1312 are magnetized parallel to the page. In some other embodiments, the magnetic domains of the ring magnet 1312 are magnetized perpendicular to the page.

Figure 14:
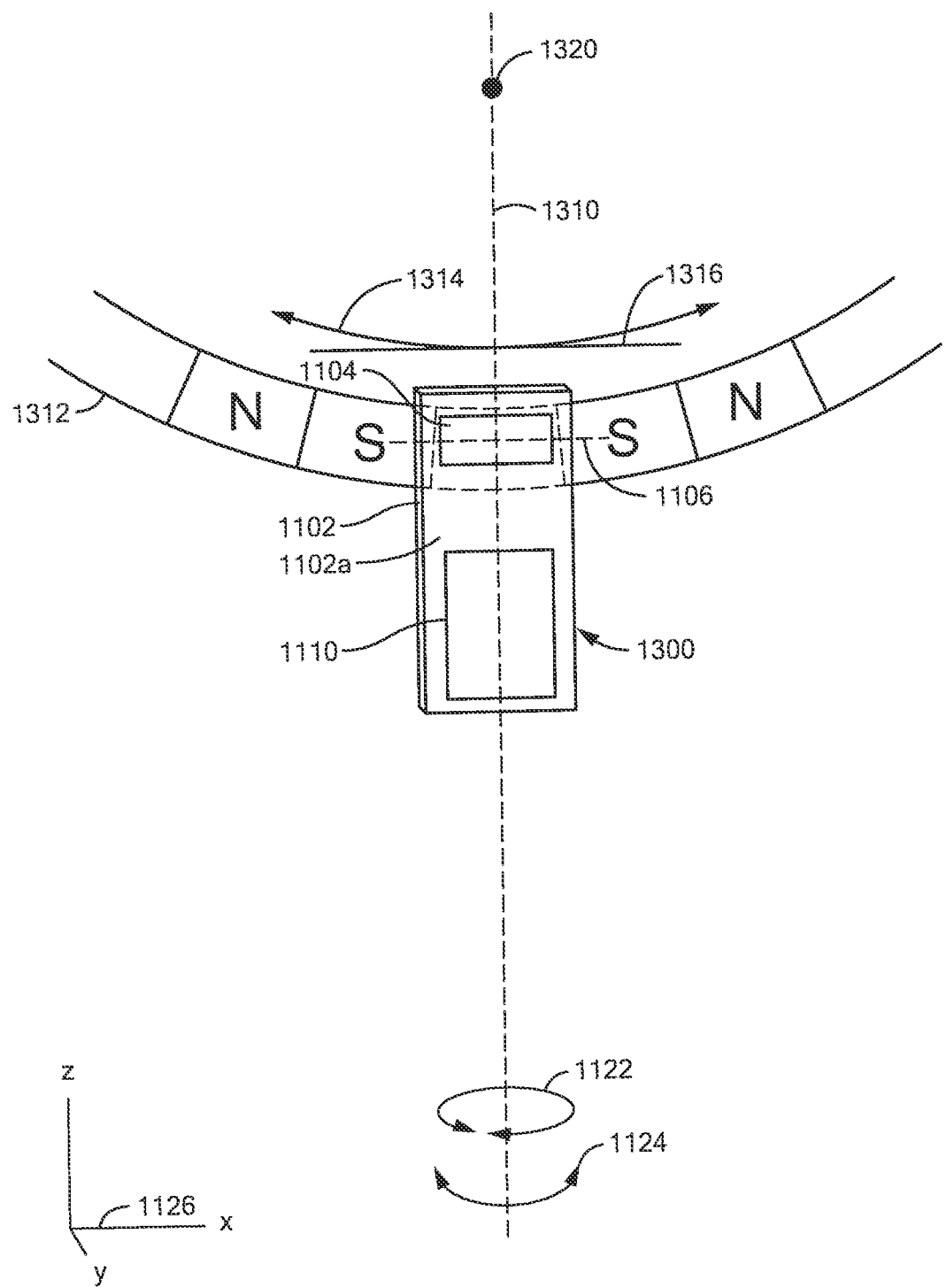
FIG. 14 is a block diagram showing an example of a magnetic field sensor having a three or more magnetic field sensing elements and an electronic circuit both disposed on a substrate, wherein the substrate overlaps a target object in the form of a ring magnet.

Referring now to FIG. 14, in which like elements of FIGS. 11 and 13 are shown having like reference designations, a magnetic field sensor 1400 is like the magnetic field sensor of FIG. 13. The magnetic field sensor 1400 has no internal magnet. Instead, the magnetic field sensor 1500 is responsive to passing magnetic domains of the ring magnet 1312.

Unlike the magnetic field sensor 1300 of FIG. 13, the substrate 1302, in particular, the three or more magnetic field sensing elements 1104, overlaps the ring magnet 1312 such that a line perpendicular to the substrate 1102 intersects the ring magnet 1312. In other embodiments, more of the substrate 1102, or the entire substrate 1102, overlaps the ring magnet 1312.

Figure 15:
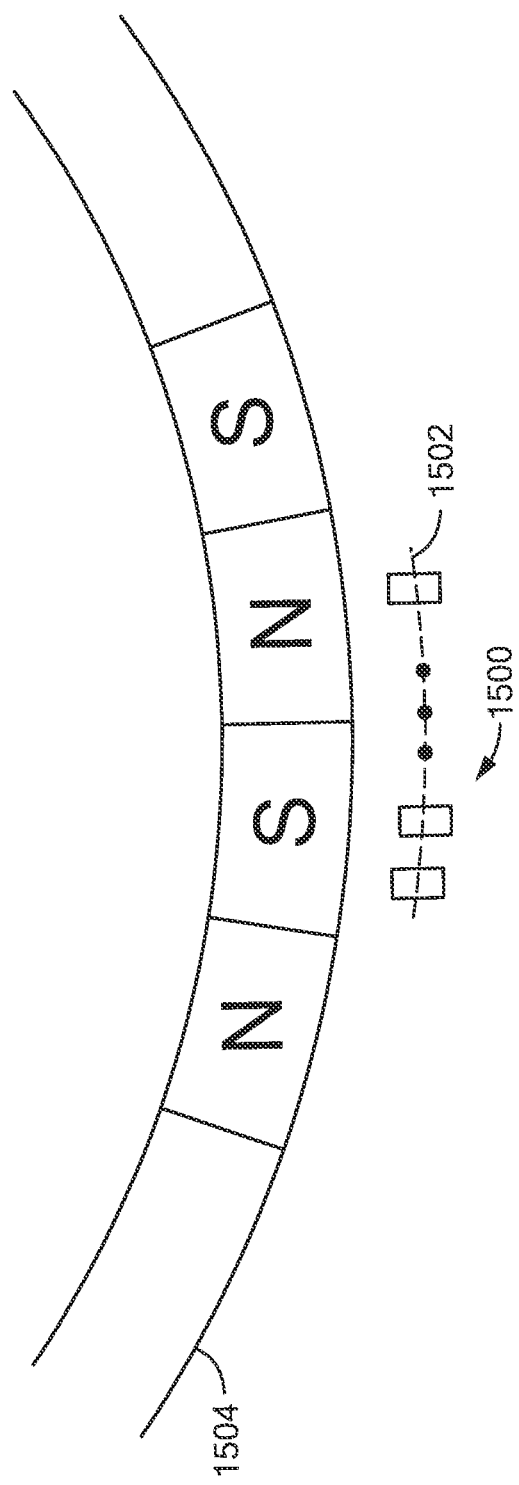
FIG. 15 is a block diagram showing an illustrative three or more magnetic field sensing elements disposed in and arc, which can be used as the three or more magnetic field sensing elements of figures above and below.

Referring now to FIG. 15, a three or more magnetic field sensing elements, e.g., 1500, can be used as the three or more magnetic field sensing elements of the magnetic field sensors described above. However, unlike the three or more magnetic field sensing elements described above, the magnetic field sensing elements 1500 can be disposed in an arc 1502. In some embodiments, a radius of curvature of the arc 1502 can be the same as a radius of curvature of a ring magnet 1504 (or alternatively, a gear) to which the three or more magnetic field sensing elements 1500 are responsive. However, other radii of curvatures are also possible.

In some alternate arrangements represented, for example, by the magnetic field sensor 1400 of FIG. 14, the magnetic field sensing elements 1500 can be disposed over and overlap the ring magnet 1504.

In some embodiments, maximum response axes of the three or more magnetic field sensing elements 1700 are parallel to each other.

In some embodiments, maximum response axes of the three or more magnetic field sensing elements 1700 are not parallel to each other, but may be parallel to the arc 1502.

In some other embodiments, the three or more magnetic field sensing elements are arranged in a straight line, which is not parallel to a tangent to the ring magnet 1504, but which is at a diagonal to the ring magnet 1504.

While ferromagnetic target objects in the form of ferromagnetic gears and ferromagnetic ring magnets are described above, in other embodiments, any of the ferromagnetic target objects can be replaced by a non-ferromagnetic target object. In these embodiments, the non-ferromagnetic target object can be an electrically conductive target object in which eddy currents can be generated by rotation of the non-ferromagnetic conductive target object in the presence of a magnetic field, which may be supplied by a magnet the same as or similar to the magnets 110, 202 of FIGS. 1 and 2, respectively. In other embodiments, a coil or an electromagnet may provide the magnetic field. The above-described magnetic field sensing elements can be responsive to magnetic fields generated by the eddy currents in the non-ferromagnetic conductive target objects. Arrangements responsive to eddy currents are described, for example, in U.S. patent application Ser. No. 13/946,417, filed Jul. 19, 2013, and entitled "Methods And Apparatus For Magnetic Sensor Having An Integrated Coil Or Magnet To Detect A Non-Ferromagnetic Target," which supplication is assigned to the assignee of the present application, and which application is incorporated by reference herein in its entirety.

From the above, it will be understood that the target object sensed with magnetic field sensors described herein can be a ferromagnetic target object (e.g., a gear of a ring magnet) or a non-ferromagnetic conductive object (e.g., a gear).

Magnetic field sensors described above and below use a sensed position of the sensed target object to identify speed and/or direction of rotation. However, similar circuits and techniques can be used to a sense a speed and/or direction of linear movement (straight or curved one) of a different (straight or curved) target object having features (e.g., teeth or magnetic regions) arranged along a line (straight or curved).

Figure 16:
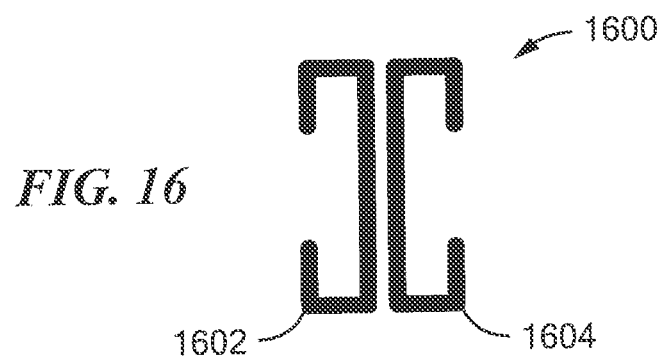
FIG. 16 is a block diagram showing a pair of magnetoresistance elements that can be used as one of the three or more magnetic field sensing elements of figures above and below.
Figure 17:
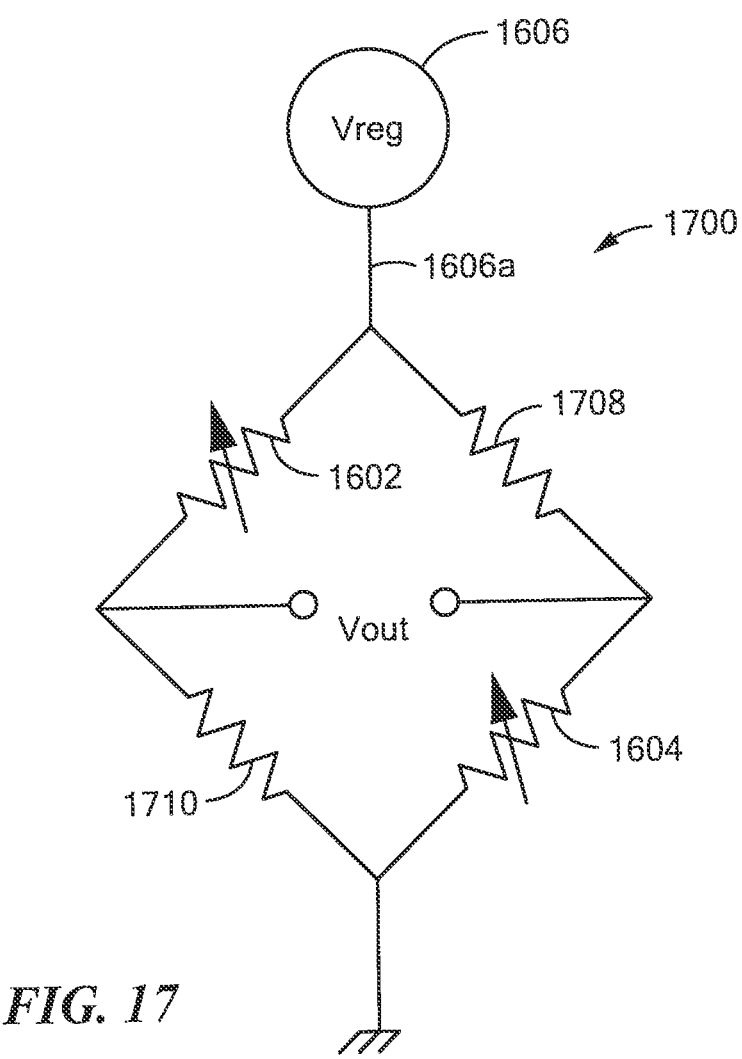
FIG. 17 is a block diagram showing the pair of magnetoresistance elements of FIG. 16 coupled in a bridge arrangement.

Referring now to FIGS. 16 and 17, a pair of magnetoresistance elements 1700 comprised of first and second magnetoresistance elements 1602, 1604 can replace any of the three or more magnetoresistance elements or three or more magnetic field sensing elements described above. The first and second magnetoresistance elements 1602, 1604 can be coupled with first and second fixed value resistors 1708, 1710 and with a voltage generator 1702 forming a full bridge arrangement.

Figure 18:
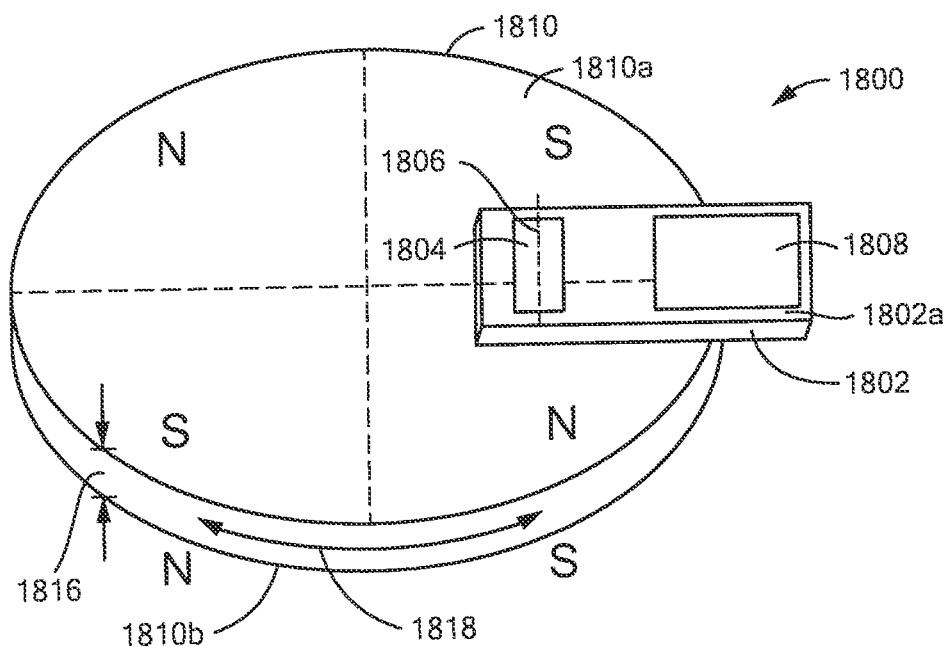
FIG. 18 is a block diagram showing an example of a magnetic field sensor having a three or more magnetic field sensing elements and an electronic circuit, both disposed on a substrate, wherein the substrate overlaps a target object in the form of a circular or disk magnet.

Referring now to FIG. 18, a magnetic field sensor 1800 can include a substrate 902 having a surface 902*a*. Three of more magnetic field sensing elements 1804 can be disposed upon the surface 1802*a*. The three or more magnetic field sensing elements can be similar to any of the above-described three or more magnetic field sensing elements.

An electronic circuit 1806 can be disposed upon the surface 1802. The electronic circuit 1806 can be similar to any of the above-described three or more magnetic field sensing elements, for example, the electronic circuits 300, 400, 500 of FIG. 3, 4, or 5.

The magnetic field sensor 1800 can be disposed proximate to, and can sense a position of and movement of, a circular (e.g., disk) magnet 1810 having a diameter and a thickness 1816. The circular magnet 1810 can have a first plurality of north poles and a first plurality of south poles, here two north poles and two south poles associated with a first surface 1810*a* of the circular magnet 1810. The circular magnet 1810 can also have a second plurality of north poles and a second plurality of south poles, here two north poles and two south poles, associated with a second surface 1810*a* of the circular magnet 1810. The first pluralities of poles can oppose the second plurality of poles across a thickness dimension 1816.

The circular magnet can be arranged to move, e.g., rotate, in a direction of an arrow. 1818.

Operation of the magnetic field sensor 1800 can be understood from discussion above in conjunction with other figures.

Figure 19:
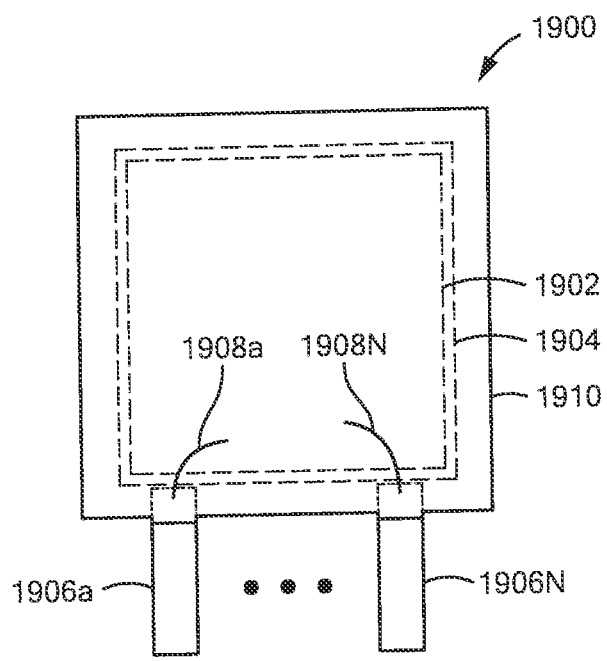
FIG. 19 is a top view showing a packed integrated circuit housing any of the substrates above.
Figure 14:
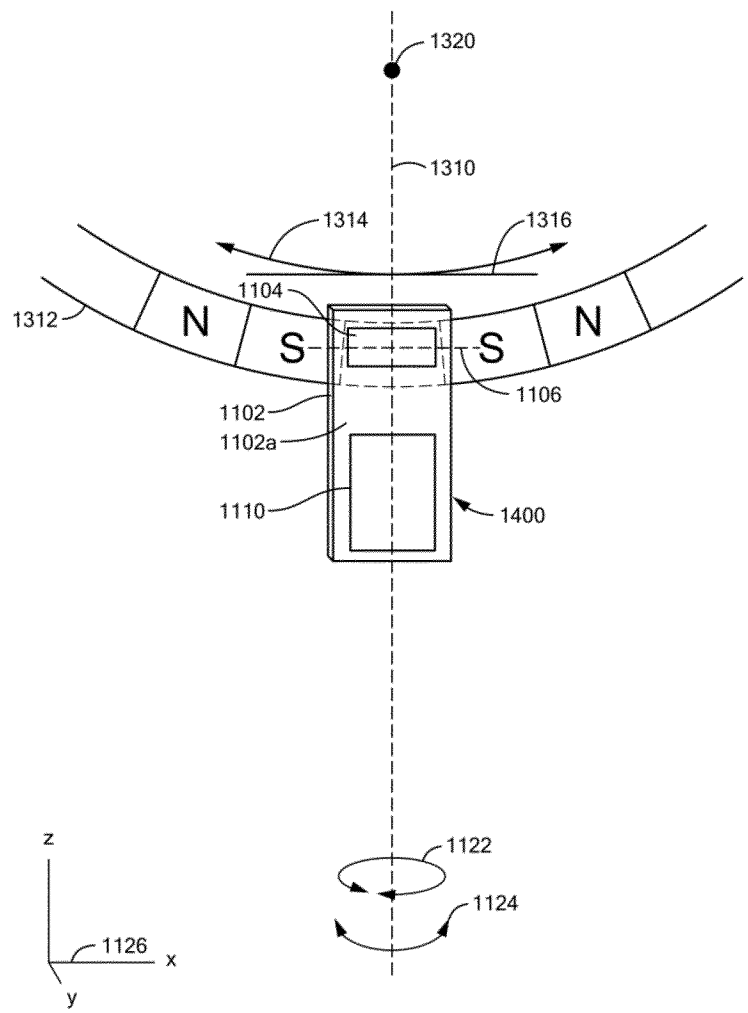

Referring now to FIG. 19, a magnetic field sensor 1900 can include a substrate 1902. The substrate can be like any of the substrates described above, and upon which any of the above magnetic field sensing elements and electronic circuits can be disposed.

Under the magnetic field sensor 1902 can be disposed a base plate 1904 of a lead frame also having a plurality of leads 1906*a*-1906N. The plurality of leads 1906*a*-1906N can be electrically coupled to the substrate with a plurality of wired bonds 1908*a*-1908N or the like, e.g., solder balls in a flip chip arrangement.

An integrated circuit package 1910, e.g., a plastic package, can surround the substrate 1902, baseplate 1904, wire bonds 1908*a*-1908N, and portions of the leads 1906*a*-1906N.

The integrated circuit 1900 can be a so-called SIP (single inline package) integrated circuit. Other package types are also possible, for example, and SOIC (small outline integrated circuit).

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor for sensing a movement of a target object, the magnetic field sensor comprising:
    a substrate having a major planar surface;
    three or more magnetic field sensing elements disposed upon the major planar surface of the substrate, the three or more magnetic field sensing elements having respective major response axes, each major response axis parallel to the major planar surface of the substrate, wherein the three or more magnetic field sensing elements comprise first and third magnetic field sensing elements and a second magnetic field sensing element disposed between the first and third magnetic field sensing elements, wherein a first spacing between the first and second magnetic field sensing elements is less than a second spacing between the second and third magnetic field sensing elements, wherein there is no other magnetic field sensing element disposed between the first and third magnetic field sensing elements, wherein the three or more magnetic field sensing elements are configured to generate three or more magnetic field signals, respectively, wherein the first, second, and third magnetic field sensing elements are configured to generate first, second, and third magnetic field signals, respectively, from among the three or more magnetic field signals; and
    an electronic circuit disposed upon the substrate and coupled to the three or more magnetic field sensing elements, the electronic circuit comprising:
        at least one analog or digital comparator configured to compare each one of the three or more magnetic field signals to at least one threshold value to generate three or more binary signals, respectively, wherein states of the three or more binary signals are each indicative of a position of the target object relative to the three or more magnetic field sensing elements for any movement speed of the target object including zero movement speed.

2. The magnetic field sensor of claim 1, wherein the electronic circuit further comprises:
    a decoder coupled to the three or more binary signals, wherein the decoder is operable to decode the three or more binary signals to generate a device output signal indicative of the position of the target object.

3. The magnetic field sensor of claim 1, wherein the first spacing is selected to result in the magnetic field sensor detecting a higher resolution of the position of the target object for selected positions of the target object and the second spacing results in the magnetic field sensor detecting a lower resolution of the position of the target object for other selected positions of the target object.

4. The magnetic field sensor of claim 2, further comprising:
    a peak-to-peak amplitude detector operable to measure a peak-to-peak amplitude of at least one of the three or more magnetic field signals and operable to generate a peak-to-peak value in accordance with the measured peak-to-peak amplitude; and
    a threshold generator module coupled to the peak-to-peak value and operable to generate the at least one threshold value as a predetermined percentage of the peak-to-peak value.

5. The magnetic field sensor of claim 4, further comprising:
    a nonvolatile memory device operable to store the at least one threshold value.

6. The magnetic field sensor of claim 2, further comprising:
    a peak-to-peak amplitude detector operable to measure three or more peak-to-peak amplitudes of the three or more magnetic field signals, respectively;
    a combining module operable to generate a peak-to-peak value in accordance with a combination of the measured three or more peak-to-peak amplitudes; and
    a threshold generator module coupled to the peak-to-peak value and operable to generate the at least one threshold value as a predetermined percentage of the peak-to-peak value.

7. The magnetic field sensor of claim 6, further comprising:
    a nonvolatile memory device operable to store the at least one threshold value.

8. The magnetic field sensor of claim 2, wherein the decoder comprises:
    a non-volatile memory device.

9. The magnetic field sensor of claim 2, wherein the device output signal is also indicative of a speed of the movement of the target object.

10. The magnetic field sensor of claim 9, wherein the device output signal is also indicative of a direction of the movement of the target object.

11. The magnetic field sensor of claim 10, wherein the electronic circuit further comprises:
    an output protocol module operable to use the device output signal to generate an output protocol signal indicative of the position of the target object, and at least one of the movement speed of the target object or the direction of the movement of the target object.

12. The magnetic field sensor of claim 2, wherein the three or more magnetic field sensing elements comprise three or more magnetoresistance elements.

13. The magnetic field sensor of claim 12, wherein the three or more magnetic field sensing elements have respective maximum response axes parallel to each other.

14. The magnetic field sensor of claim 2, wherein the decoder is further operable to store a value indicative of a measured operational characteristic of the magnetic field sensor, wherein the stored value is stored during a first time period, and wherein the stored value is recalled and used during a second different time period after the first time period.

15. The magnetic field sensor of claim 2, further comprising:
a magnet disposed proximate to the substrate, the magnet having at least two poles to generate a magnetic field parallel to the major planar surface of the substrate.

16. The magnetic field sensor of claim 2, wherein the major planar surface of the substrate overlaps the target object such that a line perpendicular to the major planar surface of the substrate and passing through at least one of the three or more magnetic field sensing elements intersects the target object.

17. The magnetic field sensor of claim 2, wherein the target object comprises a ring magnet having a plurality of alternating north and south poles, the target object to generate a magnetic field parallel to the major planar surface of the substrate.

18. The magnetic field sensor of claim 17, wherein the major planar surface of the substrate overlaps the target object such that a line perpendicular to the major planar surface of the substrate and passing through at least one of the three or more magnetic field sensing elements intersects the target object.

19. The magnetic field sensor of claim 2, wherein the three or more magnetic field sensing elements are arranged in a line within twenty degrees of parallel to a tangent to the movement of the target object.

20. The magnetic field sensor of claim 2, wherein the three or more magnetic field sensing elements are arranged in at least two parallel lines, each within twenty degrees of parallel to a tangent to the movement of the target object.

21. The magnetic field sensor of claim 2, wherein the three or more magnetic field sensing elements are arranged in an arc.

22. The magnetic field sensor of claim 2, wherein the three or more magnetic field sensing elements comprise a quantity of magnetic field sensing elements in a range of three to twenty magnetic field sensing elements.

23. The magnetic field sensor of claim 2, wherein the three or more magnetic field sensing elements comprise a respective three or more magnetoresistance elements.

24. The magnetic field sensor of claim 23, wherein the three or more magnetic field sensing elements have respective maximum response axes parallel to each other.

25. The magnetic field sensor of claim 2, wherein the electronic circuit further comprises:
a threshold calculation module coupled to receive the three or more magnetic field signals, the threshold calculation module configured to generate the at least one threshold value indicative of an amplitude of at least one of the three or more magnetic field signals, respectively; and
a non-volatile memory device operable to store the at least one threshold value,
wherein the non-volatile memory device is further operable to provide the at least one threshold value to the at least one analog or digital comparator.

26. The magnetic field sensor of claim 25, wherein the at least one threshold value is stored during a time period when the electronic circuit is powered down and wherein the stored at least one threshold value is provided to the at least one analog or digital comparator when the magnetic field sensor powers up.

27. The magnetic field sensor of claim 25, wherein the at least one threshold value is stored during a first time period, and wherein the stored at least one threshold value is provided to the at least one analog or digital comparator during a second different time period after the first time period.

28. The magnetic field sensor of claim 2, wherein the three or more magnetic field sensing elements comprise three or more vertical Hall Effect elements.

29. The magnetic field sensor of claim 2, wherein the target object comprises a ferromagnetic gear configured to rotate.

30. The magnetic field sensor of claim 2, wherein the target object comprises a ferromagnetic ring magnet configured to rotate.

31. The magnetic field sensor of claim 2, wherein the three or more magnetic field sensing elements are arranged in an arc proximate to the target object, and wherein maximum response axes of the three or more magnetic field sensing elements are parallel to each other.

32. The magnetic field sensor of claim 2, wherein the three or more magnetic field sensing elements are arranged in an arc proximate to the target object, and wherein maximum response axes of the three or more magnetic field sensing elements are not parallel to each other.

33. The magnetic field sensor of claim 2, wherein the substrate overlaps the target object such that a line perpendicular to a major surface of the substrate and passing through at least one of the three or more magnetic field sensing elements intersects the target object, and a line parallel to the major planar surface of the substrate is in a direction of the target object.

34. The magnetic field sensor of claim 2, wherein the target object comprises a non-ferromagnetic conductive target object.

35. The magnetic field sensor of claim 2, wherein the electronic circuit further comprises:
at least one analog-to-digital converter operable to convert the three or more magnetic field signals to generate at least one converted signal, the at least one analog or digital comparator to receive the at least one converted signal.

36. The magnetic field sensor of claim 2, wherein the target object comprises a circular magnet having a plurality of alternating north and south poles upon a major surface of the circular magnet, the target object to generate a magnetic field parallel to the major planar surface of the substrate.

37. The magnetic field sensor of claim 36, wherein the major planar surface of the substrate overlaps the target object such that a line perpendicular to the major planar surface of the substrate and passing through at least one of the three or more magnetic field sensing elements intersects the target object.

38. A method of sensing a movement of a target object, comprising:
generating three or more magnetic field signals with three or more magnetic field sensing elements disposed upon a major planar surface of a substrate, the three or more magnetic field sensing elements having respective major response axes, each major response axis parallel to the major planar surface of the substrate, wherein the three or more magnetic field sensing elements comprise first and third magnetic field sensing elements and a second magnetic field sensing element disposed between the first and third magnetic field sensing elements, wherein a first spacing between the first and second magnetic field sensing elements is less than a second spacing between the second and third magnetic field sensing elements, wherein there is no other magnetic field sensing element disposed between the first and third magnetic field sensing element, wherein the first, second, and third magnetic field sensing elements are configured to generate first, second, and third magnetic field signals, respectively, from among the three or more magnetic field signals; and comparing each one of the three or more magnetic field signals to at least one threshold value to generate three or more binary signals, respectively, wherein states of the three or more binary signals are each indicative of a position of the target object relative to the three or more magnetic field sensing elements for any movement speed of the target object including zero movement speed.

39. The method of claim 38, wherein the first spacing is selected to result in the method detecting a higher resolution of the position of the target object for selected positions of the target object and the second spacing results in the method detecting a lower resolution of the position of the target object for other selected positions of the target object.

40. The method of claim 38, further comprising:
measuring a peak-to-peak amplitude of at least one of the three or more magnetic field signals;
generating a peak-to-peak value in accordance with the measured peak-to-peak amplitude; and
generating the at least one threshold value as a predetermined percentage of the peak-to-peak value.

41. A magnetic field sensor for sensing a movement of a target object, the magnetic field sensor comprising:
means for generating generate three or more magnetic field signals with three or more magnetic field sensing elements disposed upon a major planar surface of a substrate, the three or more magnetic field sensing elements having respective major response axes, each major response axis parallel to the major planar surface of the substrate, wherein the three or more magnetic field sensing elements comprise first and third magnetic field sensing elements and a second magnetic field sensing element disposed between the first and third magnetic field sensing elements, wherein a first spacing between the first and second magnetic field sensing elements is less than a second spacing between the second and third magnetic field sensing elements, wherein there is no other magnetic field sensing element disposed between the first and third magnetic field sensing element wherein the first, second, and third magnetic field sensing elements are configured to generate first, second, and third magnetic field signals, respectively, from among the three or more magnetic field signals; and means for comparing each one of the three or more magnetic field signals to at least one threshold value to generate three or more binary signals, respectively, wherein states of the three or more binary signals are each indicative of a position of the target object relative to the three or more magnetic field sensing elements for any movement speed of the target object including zero movement speed.

42. The magnetic field sensor of claim 41, wherein the first spacing is selected to result in the magnetic field sensor detecting a higher resolution of the position of the target object for selected positions of the target object and the second spacing results in the magnetic field sensor detecting a lower resolution of the position of the target object for other selected positions of the target object.

43. The magnetic field sensor of claim 41, further comprising:
means for measuring a peak-to-peak amplitude of at least one of the three or more magnetic field signals;
means for generating a peak-to-peak value in accordance with the measured peak-to-peak amplitude; and
means for generating the at least one threshold value as a predetermined percentage of the peak-to-peak value.

* * * * *

UNITED STATES PATENT AND TRADEMARK OFFICE
CERTIFICATE OF CORRECTION

PATENT NO. : 10,823,586 B2
APPLICATION NO. : 16/232348
DATED : November 3, 2020
INVENTOR(S) : Jeffrey Eagen et al.

It is certified that error appears in the above-identified patent and that said Letters Patent is hereby corrected as shown below:

In the Drawings
Please replace Drawing Sheet 12 with the replacement Drawing Sheet 12.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*